United States Patent
Cho et al.

(10) Patent No.: US 11,252,705 B2
(45) Date of Patent: Feb. 15, 2022

(54) RADIO (NR) SHORT AND LONG DURATION PHYSICAL UPLINK CONTROL CHANNEL (PUCCH) DESIGN

(71) Applicant: APPLE INC., Cupertino, CA (US)

(72) Inventors: Joonyoung Cho, Portland, OR (US); Gang Xiong, Portland, OR (US); Hong He, Sunnyvale, CA (US); Lopamudra Kundu, Santa Clara, CA (US); Wook Bong Lee, Pleasanton, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/496,904

(22) PCT Filed: Mar. 22, 2018

(86) PCT No.: PCT/US2018/023877
§ 371 (c)(1),
(2) Date: Sep. 23, 2019

(87) PCT Pub. No.: WO2018/175801
PCT Pub. Date: Sep. 27, 2018

(65) Prior Publication Data
US 2020/0092876 A1      Mar. 19, 2020

Related U.S. Application Data

(60) Provisional application No. 62/476,594, filed on Mar. 24, 2017, provisional application No. 62/476,425, filed on Mar. 24, 2017.

(51) Int. Cl.
*H04W 72/04* (2009.01)
*H04L 5/00* (2006.01)

(52) U.S. Cl.
CPC ....... *H04W 72/0413* (2013.01); *H04L 5/0048* (2013.01)

(58) Field of Classification Search
CPC ......... H04W 72/0413; H04W 72/0446; H04W 72/04; H04B 1/713; H04J 113/0055;
(Continued)

(56) References Cited

U.S. PATENT DOCUMENTS

| | | | |
|---|---|---|---|
| 2012/0307760 A1* | 12/2012 | Han | H04L 5/0055 370/329 |
| 2014/0198747 A1* | 7/2014 | Ouchi | H04L 5/0053 370/329 |

(Continued)

OTHER PUBLICATIONS

R1-1700368; 3GPP TSG RAN WG1 NR Ad-Hoc Meeting; Source: Intel Corporation; Title: UL control channel design with long duration; Jan. 16-20, 2017; Spokane, WA, USA.
(Continued)

*Primary Examiner* — Elton Williams

(57) ABSTRACT

Technology for a user equipment (UE) operable to encode a New Radio (NR) short duration physical uplink control channel (PUCCH) for transmission to a Next Generation NodeB (gNB) is disclosed. The UE can identify uplink control information (UCI) for the UE. The UE can multiplex, using frequency division multiplexing (FDM) at the UE, the UCI and a pseudo-random sequence associated with a demodulation reference signal (DMRS) onto a plurality of subcarriers in one or more physical resource blocks (PRBs) of one or more orthogonal frequency division multiplexing (OFDM) symbols. The UE can encode the UCI and the pseudo-random sequence associated with the DMRS multiplexed onto the plurality of subcarriers of the one or more OFDM symbols for transmission on the NR short duration PUCCH to the gNB.

18 Claims, 21 Drawing Sheets

(58) Field of Classification Search
CPC ...... H04J 113/16; H04J 13/0055; H04J 13/16; H04L 5/0048
See application file for complete search history.

(56) References Cited

U.S. PATENT DOCUMENTS

| | | | | |
|---|---|---|---|---|
| 2018/0124815 | A1* | 5/2018 | Papasakellariou | H04W 72/042 |
| 2019/0097779 | A1* | 3/2019 | Wu | H04L 1/1858 |
| 2019/0296879 | A1* | 9/2019 | Kwak | H04W 52/325 |
| 2019/0342877 | A1* | 11/2019 | Matsumura | H04L 25/0226 |
| 2020/0015225 | A1* | 1/2020 | Matsumura | H04J 13/16 |

OTHER PUBLICATIONS

R1-1700951; 3GPP TSG RAN WG1 NR Ad-Hoc Meeting; Source: Samsung; Title: UL Control Channel Design: Long Format; Jan. 16-20, 2017; Spokane, WA, USA.

R1-1702979; 3GPP TSG RAN WG1 #88; Source: Samsung; Title: UL Control Channel Design: Short Format; Feb. 13-17, 2017; Athens, Greece.

R1-1703298; 3GPP TSG RAN WG1 #88; Source: Ericsson; Title: On short PUCCH enabling fast ACK/NACK; Feb. 13-17, 2017; Athens, Greece.

R1-1703317; 3GPP TSG RAN WG1 #88; Source: Nokia; Title: On the design of short PUCCH for NR; Feb. 13-17, 2017; Athens, Greece.

R1-1703320; 3GPP TSG RAN WG1 #NR; Source: Nokia; Title: On the long PUCCH formats for NR; Feb. 13-17, 2017; Athens, Greece.

Intel Corporation, "CM evaluation for short UL control channel", R1-1704761, 3GPP TSG RAN WG1 Meeting #88bis, Spokane, Washington, Agenda Item 8 1.3.2.6, Apr. 3-7, 2017, 3 pages.

LG Electronics, "Design of long duration NR-PUCCH format", R1-1700505, 3GPP TSG RAN WG1 Ad-Hoc Meeting, Spokane, Washington, Agenda Item 5.1 3.2, Jan. 16-20, 2017, 6 pages.

LG Electronics, "Design of short duration NR-PUCCH format", R1-1700504, 3GPP TSG RAN WG1 NR Ad-Hoc Meeting, Spokane, Washington, Agenda Item 5.1 3.2, Jan. 16-20, 2017, 6 pages.

Samsung, "Consideration of Variable Slot Length", R1-1702982, 3GPP TSG RAN WG1 #88, Athens, Greece, Agenda Item 8.1.3.2 2, Feb. 13-17, 2017, 4 pages.

Samsung, "UL Control Channel Design: Short Format", R1-1702979, 3GPP TSG WG1 #88, Athens, Greece, Agenda Item 8.1.3.2 1, Feb. 13-17, 2017, 3 pages.

* cited by examiner

| Format | Payload size (bit) | UCI types | Modulation | # PRB (in case w/o freq. div) | Design summary |
|---|---|---|---|---|---|
| 0 | 1 | SR | OOK | 1 | Length-12 sequence per DFT-s-OFDM symbol |
| 1 | 1 or 2 | HARQ-ACK | BPSK/QPSK | 1 | Floor(x/2) DMRS symbols for length x, length-12 sequence per DFT-s-OFDM symbol |
| 2 | ~ a few tens | Any UCI type and combination | QPSK | ~2 | floor(x/3) DMRS symbols for length x |
| 3 | ~ a few hundreds | Any UCI type and combination | QPSK | Adaptable | Dynamic switching between Format 2 and 3, no UE multiplexing within a PRB |

FIG. 7

RADIO (NR) SHORT AND LONG DURATION PHYSICAL UPLINK CONTROL CHANNEL (PUCCH) DESIGN

BACKGROUND

Wireless systems typically include multiple User Equipment (UE) devices communicatively coupled to one or more Base Stations (BS). The one or more BSs may be Long Term Evolved (LTE) evolved NodeBs (eNB) or New Radio (NR) next generation NodeBs (gNB) that can be communicatively coupled to one or more UEs by a Third-Generation Partnership Project (3GPP) network.

Next generation wireless communication systems are expected to be a unified network/system that is targeted to meet vastly different and sometimes conflicting performance dimensions and services. New Radio Access Technology (RAT) is expected to support a broad range of use cases including Enhanced Mobile Broadband (eMBB), Massive Machine Type Communication (mMTC), Mission Critical Machine Type Communication (uMTC), and similar service types operating in frequency ranges up to 100 GHz.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 7 is a table of long physical uplink control channel (PUCCH) formats in accordance with an example;

Figure 1:
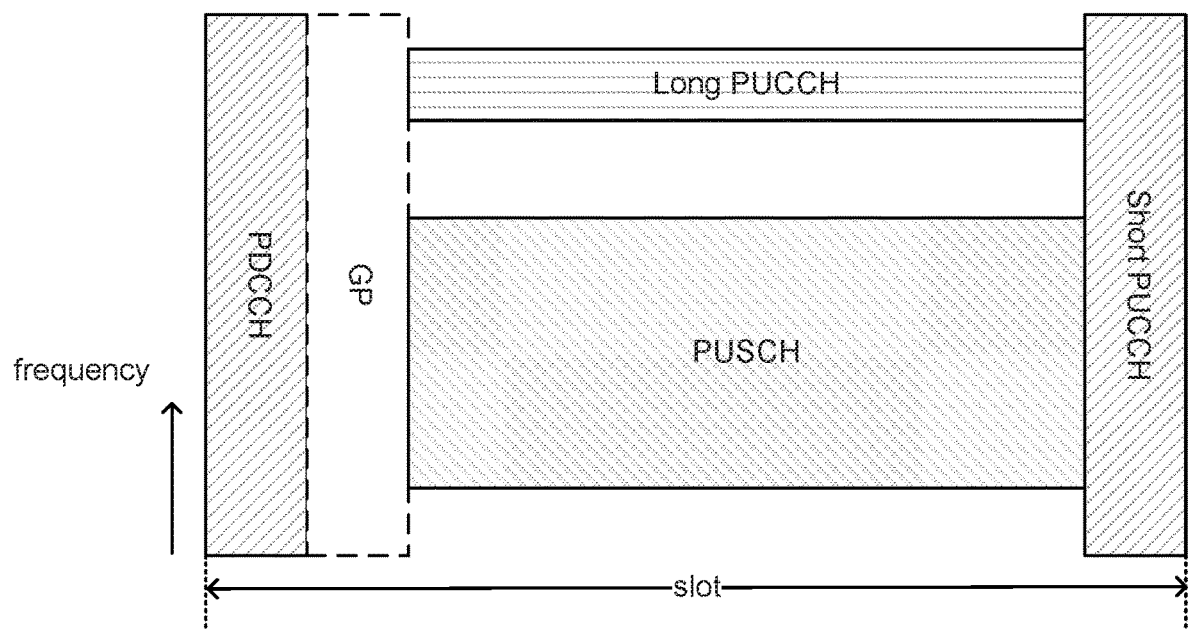
FIG. 1 illustrates a New Radio (NR) uplink control channel in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

Definitions

As used herein, the term "User Equipment (UE)" refers to a computing device capable of wireless digital communication such as a smart phone, a tablet computing device, a laptop computer, a multimedia device such as an iPod Touch®, or other type computing device that provides text or voice communication. The term "User Equipment (UE)" may also be referred to as a "mobile device," "wireless device," of "wireless mobile device."

As used herein, the term "Base Station (BS)" includes "Base Transceiver Stations (BTS)," "NodeBs," "evolved NodeBs (eNodeB or eNB)," and/or "next generation NodeBs (gNodeB or gNB)," and refers to a device or configured node of a mobile phone network that communicates wirelessly with UEs.

As used herein, the term "cellular telephone network," "4G cellular," "Long Term Evolved (LTE)," "5G cellular" and/or "New Radio (NR)" refers to wireless broadband technology developed by the Third Generation Partnership Project (3GPP).

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Mobile communication has evolved significantly from early voice systems to today's highly sophisticated integrated communication platform. The next generation wireless communication system, Fifth Generation (5G), or New Radio (NR) access technology can provide access to information and the sharing of data by various users and applications. NR is expected to be a unified network/system that is targeted to meet vastly different and sometimes conflicting performance dimensions and services. Such diverse multi-dimensional specifications are driven by different services and applications. In general, NR will evolve based on 3GPP LTE-Advanced with additional potential new Radio Access Technologies (RATs) to provide improved, simple and seamless wireless connectivity solutions. NR can enable increased wireless connectivity and deliver fast, rich content and services.

FIG. 1 illustrates an example of a New Radio (NR) uplink control channel. The NR uplink control channel can include a long duration physical uplink control channel (PUCCH) and a short duration PUCCH within a slot. The long and short duration PUCCHs can be used by a user equipment (UE) to carry uplink control information (UCI) to NR gNBs. Multiple OFDM symbols can be allocated for the long PUCCH to improve link budget and uplink coverage for the control channel. For the long PUCCH, the OFDM symbols can employ Discrete Fourier Transform-spread-OFDM (DFT-s-OFDM), in which DFT precoding is applied before inverse DFT (IDFT) at a transmitter. The long PUCCH can range from 4 DFT-s-OFDM symbols in length to 14 DFT-s-OFDM symbols in length. The long PUCCH can be multiplexed with an UL data channel, such as the physical uplink shared channel (PUSCH), in frequency division multiplexing (FDM) manner. The short PUCCH can be multiplexed with the PUSCH in a time division multiplexing (TDM) manner, and the short PUCCH can employ one or two OFDM symbols. In order to accommodate the DL to UL and UL to DL switching time and round-trip propagation delay, a guard period (GP) can be inserted between the NR physical downlink control channel (NR PDCCH) and the PUSCH.

In one example, there can be various use cases for the short and long PUCCHs. For example, the short PUCCH can be applicable for UEs close to the gNB, such that the short duration transmission does not incur a serious coverage issue. The short PUCCH can provide higher resource efficiency as it takes a less amount of resources. The short PUCCH can be used for a low latency (delay) transmission due to the short duration, e.g., within a slot, DL data reception and the corresponding UL response on the short PUCCH can be supported. As another example, the long PUCCH can provide a coverage extension for UEs at the cell edge. The long transmission duration can increase the total received signal energy and offset the significant path loss due to the long distance from the gNB. The long PUCCH can provide increased immunity to intercell interference due to additional DFT-s-OFDM symbols within the transmission duration as compared to the short duration PUCCH.

In one configuration, various designs for the NR short PUCCH are described. Each short PUCCH can carry a different type or payload size of UCI. The NR PUCCHs are designed so that the same time/frequency resource can be shared between different types of PUCCHs and also different UEs in order to enhance efficiency of resource usage.

In one example, with respect to a short PUCCH to carry 1~2 hybrid automatic repeat request acknowledgement (HARQ-ACK) bits, two contiguous physical resource blocks (PRBs) can be a minimum resource unit. A demodulation reference signal (DMRS) and UCI can employ length-12 constant amplitude zero autocorrelation (CAZAC) sequences, respectively, and can be multiplexed in frequency division multiplexing (FDM) on different subcarriers alternatingly. In addition, multiplexing with short SR PUCCH can be supported on either DMRS or UCI subcarriers.

In one example, pseudo-random sequences are employed for the DMRS and are mapped onto subcarriers. Therefore, when references are made to UCI being multiplexed with the DMRS and mapped onto subcarriers, the UCI is actually multiplexed to a pseudo-random sequence associated with the DMRS, which are then mapped onto the subcarriers.

In another example, with respect to a different design for a short PUCCH to carry 1~2 HARQ-ACK bits, two contiguous PRBs can be the minimum resource unit for the short PUCCH. A length-12 CAZAC sequence can be applied on even or odd subcarriers within the two PRBs, and on-off keying (OOK) can be employed. In addition, multiplexing with a short HARQ-ACK PUCCH can be supported on either the DMRS or UCI subcarriers.

In one example, with respect to a simultaneous transmission of HARQ-ACK and SR from a same UE, in cases that a UE transmits HARQ-ACK and SR in the same slot, the comb with SR can be used to deliver HARQ-ACK modulation symbols in order to indicate that active SR has been transmitted from the UE along with HARQ-ACK, and the other comb is used to transmit DMRS for the HARQ-ACK.

In one example, the set of subcarriers with either even or odd indexes can be referred to as even or odd comb, respectively. When the same signal waveform is repeated within a given duration, then a Discrete Fourier Transform of the signal waveform (which equals a representation of the signal in the frequency domain) results that the signal is mapped on either even or odd comb. Whether the signal is mapped on even or odd combs is determined by whether the same signal waveform is repeated or a sign converted waveform replica is repeated in the 2nd half duration.

In one example, with respect to a short PUCCH to carry a few tens of UCI bits, the DMRS can be sent on four subcarriers per PRB (i.e., 4 subcarriers per 12 subcarriers), which can result in an overhead of $1/3$. Each UCI subcarrier can carry a quadrature phase shift keying (QPSK) symbol corresponding to different UCI encoded bits. In addition, both non-contiguous and contiguous allocations can be supported by the network configuration.

In one example, in cellular networks, UEs can support various types and payload sizes of UCI. Multiple short PUCCH structures can be employed for carrying 1~2 bits of hybrid ARQ acknowledgement (HARQ-ACK), a 1-bit scheduling request (SR), and a few tens of UCI bits. In designing the short PUCCH structures, sharing time/frequency resource between different types of PUCCHs and also between different UEs can be taken into account in order to enhance resource utilization and spectral efficiency. In addition, the short PUCCH structures can consider flexible configuration of resource amount and locations for the PUCCHs depending on the UCI payload size, deployment scenarios, etc.

Figure 2:
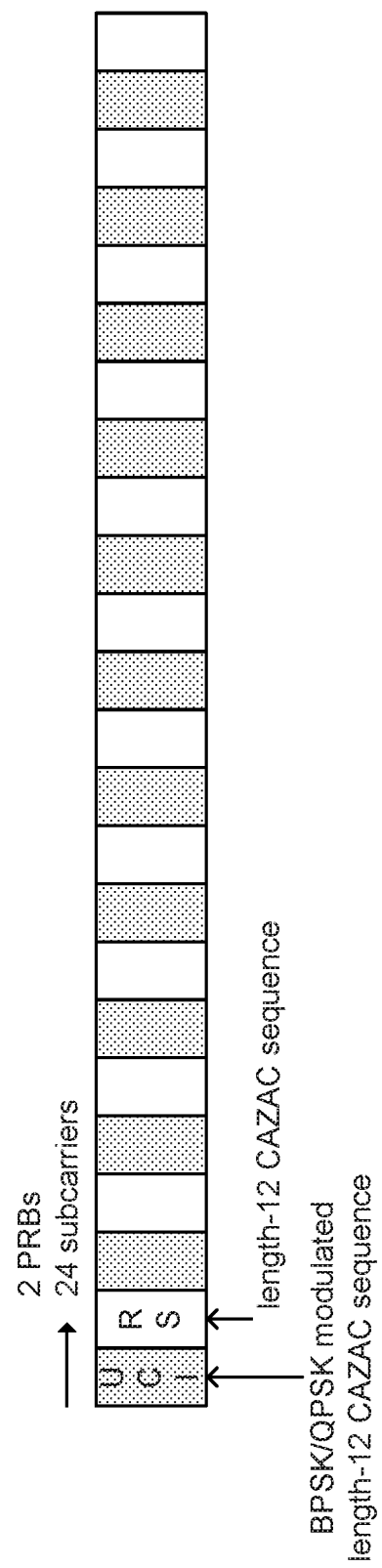
FIG. 2 illustrates a short physical uplink control channel (PUCCH) that carries one or two hybrid automatic repeat request acknowledgement (HARQ-ACK) bits in accordance with an example.

FIG. 2 illustrates an example of a short PUCCH that carries one or two HARQ-ACK bits. The short PUCCH can span two PRBs, which can correspond to 24 subcarriers. The short PUCCH can carry UCI that is multiplexed with a DMRS using FDM, in which the UCI and the DMRS can be in alternating subcarriers. The short PUCCH can employ binary phase shift keying (BPSK) and/or quadrature phase shift keying, as well as CAZAC sequences. For example, the UCI can be a BPSK/QPSK modulated length-12 CAZAC sequence, and the DMRS can be a length-12 CAZAC sequence.

In one example, as shown in FIG. 2, a short duration PUCCH structure can be employed to carry 1~2 HARQ-ACK bits, which can indicate a decoding success/failure to a received DL data. The transmitted waveform can be based on cyclic prefix OFDM (CP-OFDM) which can multiplex the HARQ-ACK and DMRS signals on different subcarriers. The DMRS and HARQ-ACK can be multiplexed in FDM using different subcarriers alternatingly within two contiguous PRBs. This design can result in a ½ DMRS overhead, which can provide an improved performance for a short PUCCH that carries 1~2 UCI bits.

In one example, two length-12 CAZAC sequences can be applied on the HARQ-ACK and DMRS subcarriers without discrete Fourier transform (DFT) precoding. In this example, BPSK and QPSK modulations can be applied for the cases of 1 and 2 HARQ-ACK bits, respectively. The CAZAC sequence for the HARQ-ACK can be modulated by BPSK or QPSK modulation symbols corresponding to the encoded HARQ-ACK bits, and then mapped on the 12 subcarriers. The DMRS CAZAC sequence can directly be mapped on the subcarriers without modulation. As both sequences are low peak-to-average power ratio (PAPR)/cubic metric (CM) CAZAC sequences, assigning different cyclic shifts to the HARQ-ACK and DMRS sequences can lead to lower PAPR/CM as compared to using the same cyclic shift for both sequences by avoiding constructive combining of waveforms resulting from the HARQ-ACK and DMRS sequences.

In one example, in view of multiple user multiplexing, the short HARQ-ACK PUCCHs for different UEs can be multiplexed within the same PRB by assigning different cyclic shifts for the CAZAC sequences to the UEs. The cyclic shifts of the HARQ-ACK and DMRS sequences can have a non-zero constant offset for low PAPR/CM, and a UE specific cyclic shift value for each UE can be applied to both the HARQ-ACK and DMRS sequences on top of the constant offset. In addition, multiple sets of two PRBs for the short HARQ-ACK PUCCH can be configured on distant frequency blocks in order to benefit from frequency and interference diversity. By utilizing the DMRS transmitted on each frequency block, the HARQ-ACK PUCCHs sent on the distant frequency blocks can coherently be combined at the gNB receiver. Spatial diversity can be additionally pursued by assigning different cyclic shifts to the PUCCHs transmitted from the respective transmit antennas from a UE.

Figure 3:
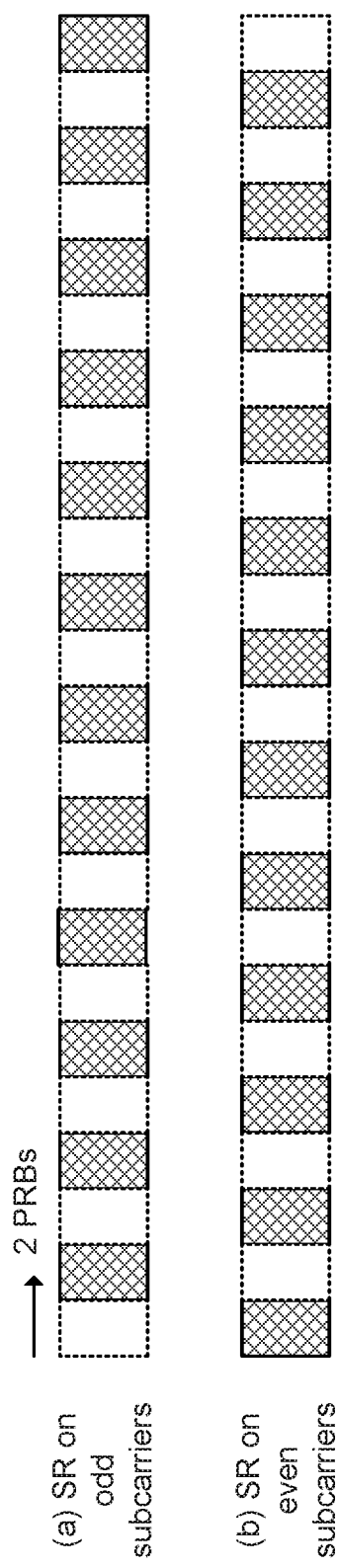
FIG. 3 illustrates a short physical uplink control channel (PUCCH) that carries a one-bit scheduling request (SR) in accordance with an example.

FIG. 3 illustrates an example of a short PUCCH that carries a one-bit SR. In this example, a length-12 CAZAC sequence can be applied on even or odd subcarriers within two PRBs with employing on-off keying (OOK). A UE can transmit the sequence on a configured comb when the UE is to have a resource scheduled for a PUSCH transmission in UL, and the SR resource can be left unused otherwise.

In one example, SR PUCCHs for different UEs can be multiplexed within the same PRB by assigning different cyclic shifts for the CAZAC sequences to the different UEs. Also, as a short SR PUCCH can use either odd or even subcarriers only, the short SR PUCCH can be multiplexed on the corresponding comb with either DRMS or HARQ-ACK of short HARQ-ACK PUCCHs within the same PRB. The cyclic shift offset, comb index and PRB index can be configured via high layer signaling in a UE specific manner. Multiple sets of two PRBs for the short SR PUCCH can be configured on distant frequency blocks as well in order to enhance frequency diversity gain.

Figure 4:
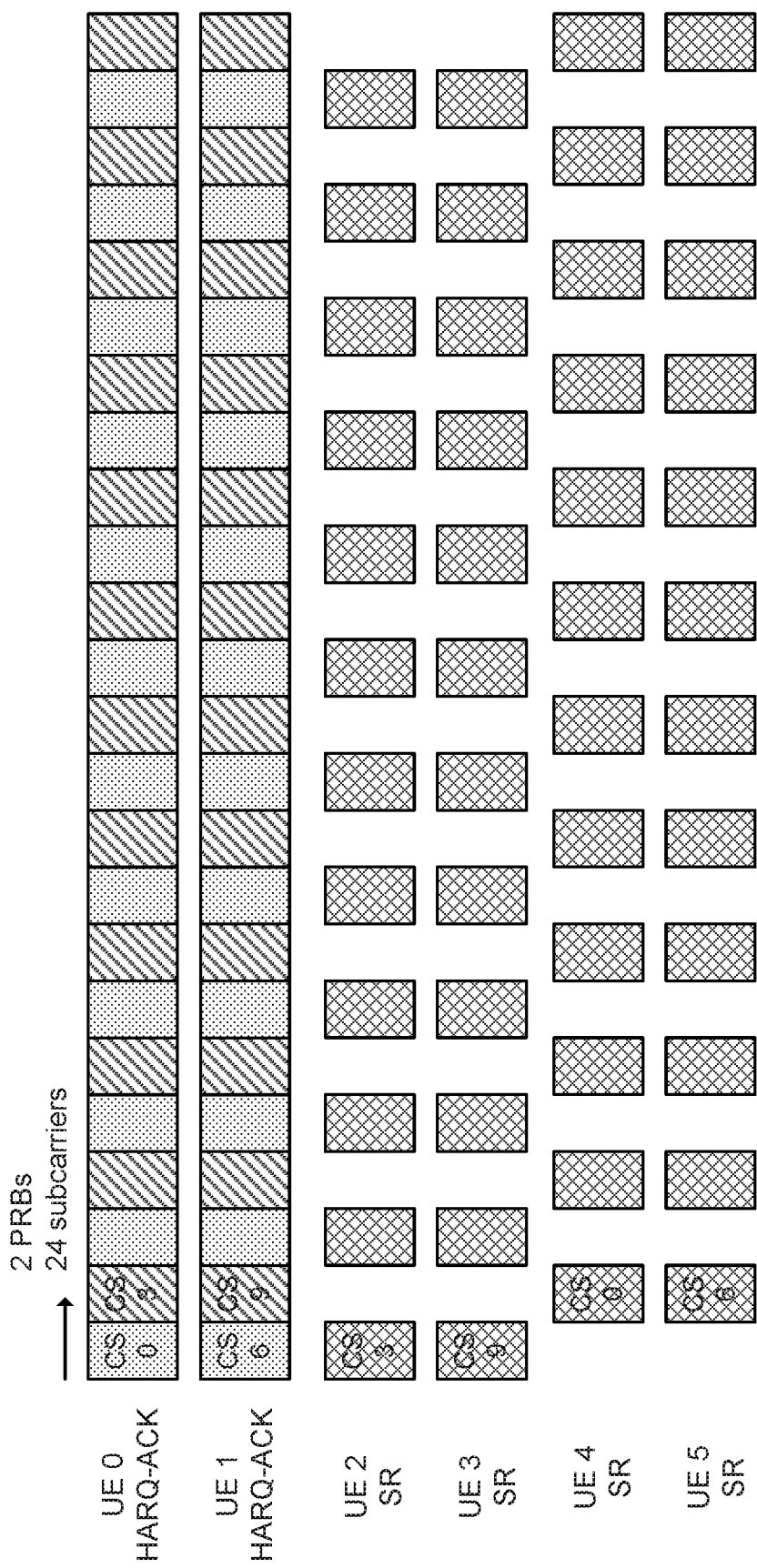
FIG. 4 illustrates multiplexing of short physical uplink control channels (PUCCHs) for hybrid automatic repeat request acknowledgement (HARQ-ACK) and scheduling request (SR) from different user equipment (UEs) in accordance with an example.

FIG. 4 illustrates an example of multiplexing of short PUCCHs for HARQ-ACK and SR from different UEs. In this example, each UE can be assigned different cyclic shifts for the CAZAC sequences with the minimum cyclic shift offset 3. Each of the SR PUCCHs can be sent on either odd or even comb only with being multiplexed with DMRS or HARQ-ACK sequences of the HARQ-ACK PUCCHs. In cases that a UE happens to transmit HARQ-ACK and SR in the same slot, SR resource can be utilized to deliver HARQ-ACK information in order to indicate that active SR has been transmitted from the UE along with HARQ-ACK. Specifically, the comb with SR for the UE can be used to deliver HARQ-ACK modulation symbols and the other comb can be used to transmit DMRS for the HARQ-ACK.

For example, in cases that UE 1 and UE 2 are the same UE, a HARQ-ACK modulation symbol can be carried on the CAZAC sequence with cyclic shift 3 on the even subcarriers, which has been assigned for the SR, and the DMRS can be carried on the CAZAC sequence with cyclic shift 9 on the odd subcarriers, which has been assigned for the DMRS. On the other hand, in cases that UE 1 and UE 4 are the same UE, a HARQ-ACK modulation symbol can be carried on the CAZAC sequence with cyclic shift 0 on the odd subcarriers, which has been assigned for the SR, and the DMRS can be carried on the CAZAC sequence with cyclic shift 6 on the even subcarriers, which has actually been assigned for the HARQ-ACK DMRS. The gNB can provide a configuration such that resources for the HARQ-ACK PUCCH and the SR PUCCH for the same UE in a slot are assigned in the same PRBs.

Figure 5:
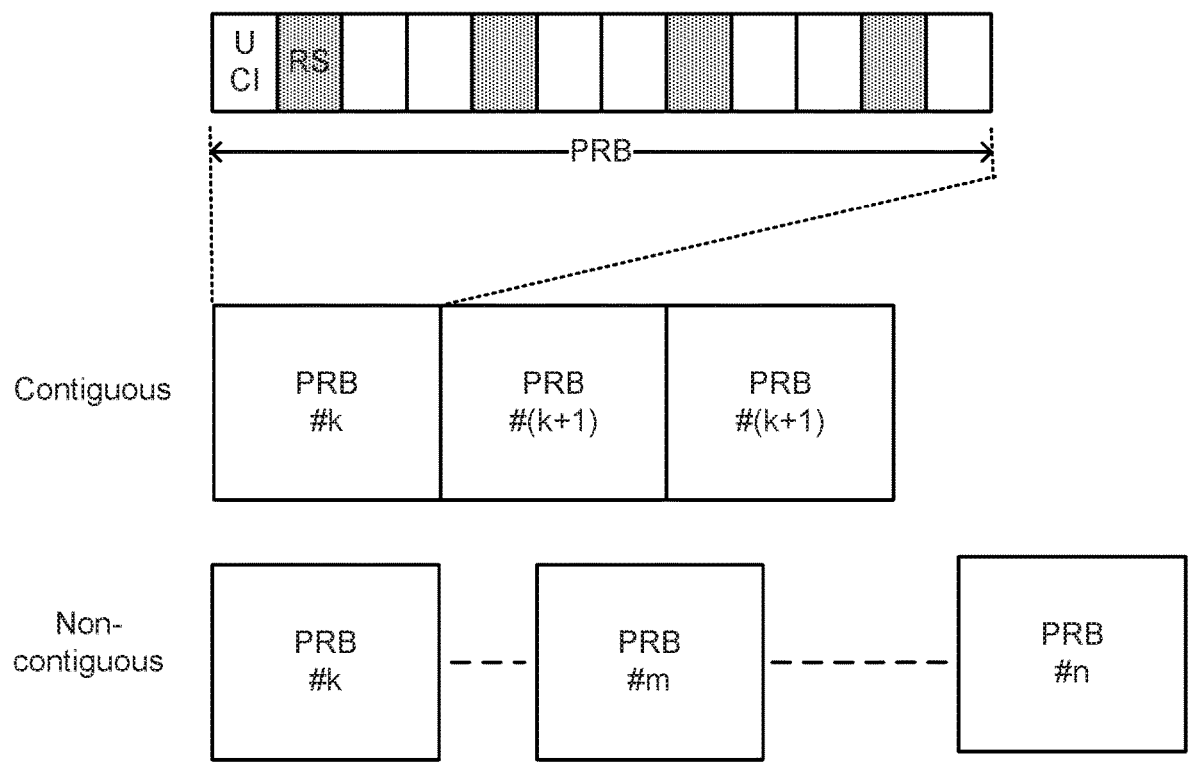
FIG. 5 illustrates a physical resource block (PRB) and subcarrier configuration for a short physical uplink control channel (PUCCH) that carries more than two uplink control information (UCI) bits in accordance with an example.

FIG. 5 illustrates an example of a PRB and subcarrier configuration for a short PUCCH that carries more than two UCI bits. In this example, a given PRB used to form the short PUCCH includes 12 subcarriers, wherein 4 subcarriers of the 12 subcarriers correspond to the DMRS, and 8 subcarriers of the 12 subcarriers correspond to the UCI. In this example, the 4 subcarriers of the 12 subcarriers that correspond to the DMRS include subcarriers 1, 4, 7 and 11 of the short PUCCH.

In one example, the UCI bits can include CSI, beam information, multiple HARQ-ACK bits and any combination of these UCI types. The DMRS and UCI can be multiplexed in FDM using different subcarriers, and the DMRS can be sent on four subcarriers per PRB, resulting in a DMRS overhead of ⅓, which provides an optimal performance.

In one example, each UCI subcarrier can carry a QPSK symbol corresponding to different UCI encoded bits. No sequence can be additionally applied on UCI subcarriers, unlike the short PUCCH for carrying 1~2 HARQ-ACK bits, where UCI subcarriers can carry a sequence modulated by a HARQ-ACK BPSK/QPSK symbol.

In one example for reliable performance of the short PUCCH format, technical aspects such as frequency diversity gain, channel estimation performance and robustness under delay spread can be considered in the structure design. The structure can aim to support up to around 20 UCI bits for a code rate of approximately ½. In this regard, three PRBs can be assumed for the short PUCCH format and can carry 24 QPSK symbols with ⅓ DMRS overhead.

With respect to FIG. 5, various structures can be used for the short PUCCH to carry up to a few dozens of UCI bits. For example, a first structure can employ three contiguous PRBs with a length-12 CAZAC sequence for the DMRS across the PRBs. A second structure can employ three contiguous PRBs with a length-4 DFT sequence for the DMRS on each PRB. A third structure can employ three non-contiguous PRBs with a length-4 DFT sequence for the DMRS on each PRB. Among these three candidate structures, non-contiguous PRB allocations can allow for larger frequency diversity gain and on the other hand, contiguous PRB allocations with a length-12 CAZAC sequence can provide a higher channel estimate SNR and more robustness against inter-cell interference.

Figure 6A:
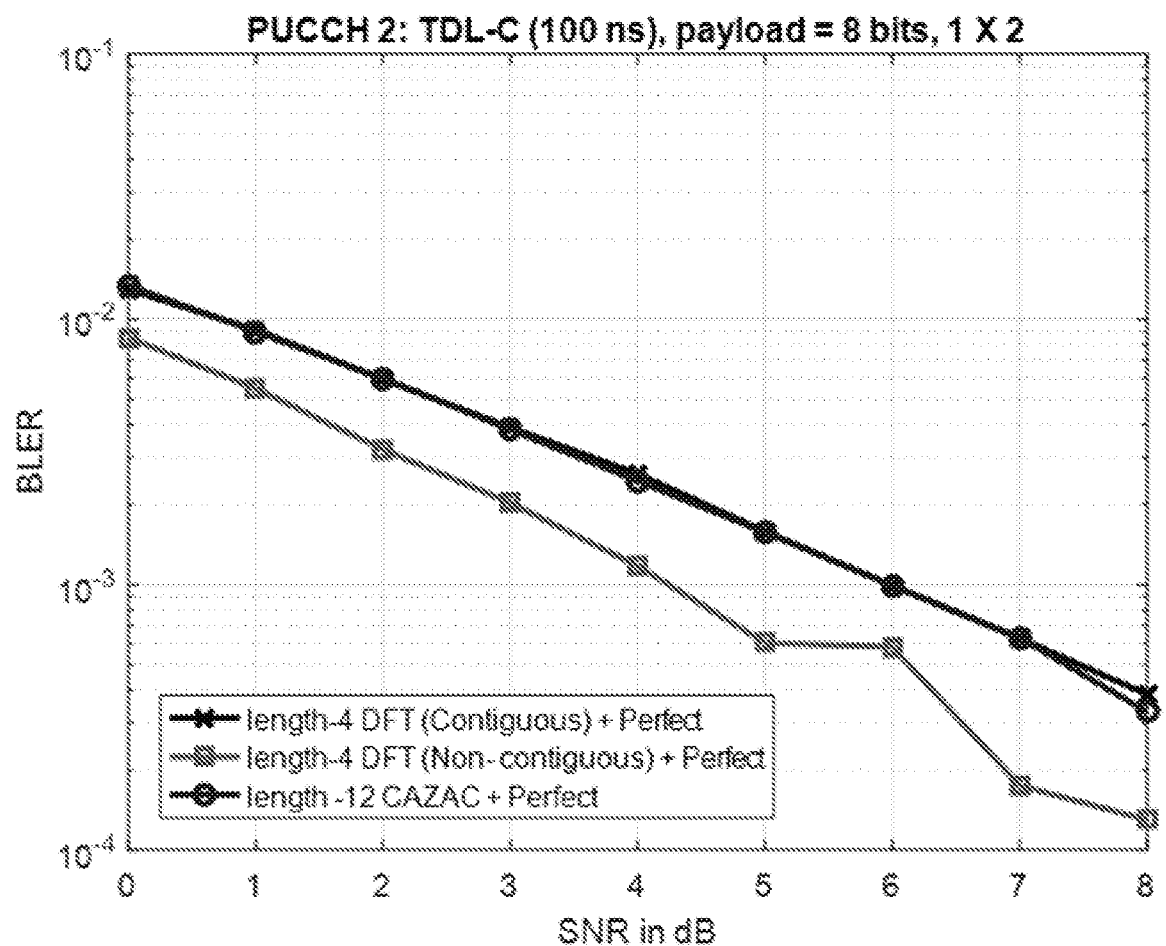
FIGS. 6A and 6B illustrate performances of short physical uplink control channel (PUCCH) structures in accordance with an example.
Figure 6B:
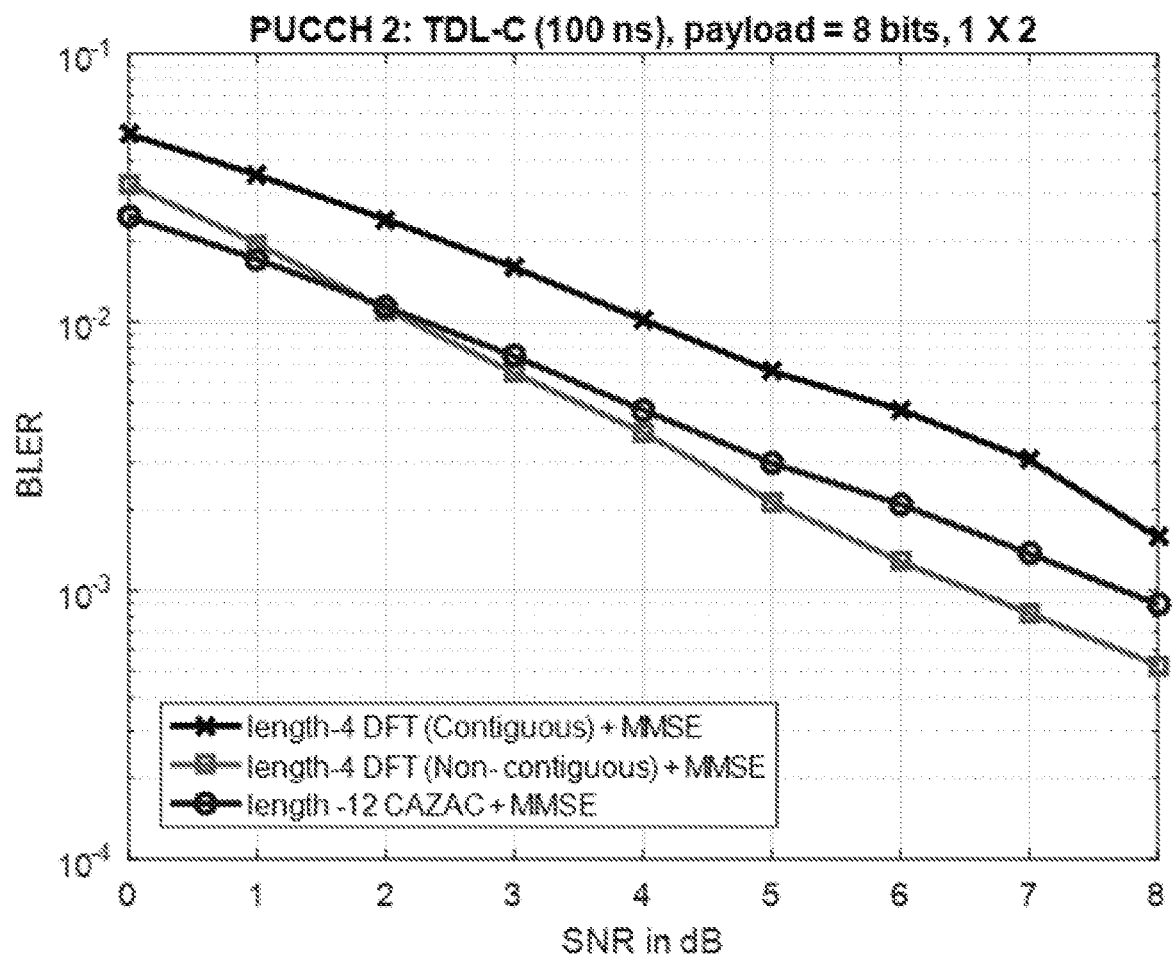

FIGS. 6A and 6B illustrate exemplary performances of short PUCCH structures. These evaluations have been performed for a UCI payload size of 8 bits and a channel root mean square (RMS) delay spread of 100 ns. For non-contiguous allocations, the separation between PRBs is 48 PRBs.

As shown in FIG. 6A, in case of ideal channel estimation, non-contiguous allocation with a length-4 DMRS sequence can outperform by~1.5 decibels (dB) the contiguous allocation cases with length-4 and length-12 sequences. As shown in FIG. 6B, in case of real channel estimation, non-contiguous allocation with a length-4 DMRS sequence can outperform a contiguous allocation with a length-12 CAZAC for a signal-to-noise ratio (SNR) greater than 2 dB and shows similar or worse performance for an SNR less than 2 dB, since the use of a length-12 CAZAC can provide a more reliable channel estimate due to combining the channel estimate for a longer sequence than the cases using length-4 DMRS sequences. Also, in cases that the channel bandwidth is not wide enough to provide sufficient frequency diversity gain for non-contiguous allocations, a contiguous allocation with a length-12 CAZAC sequence can outperform the non-contiguous allocation at an increased level, in relation to FIG. 6B. Therefore, it can be beneficial to enable the gNB to configure the frequency resource for the short PUCCH in non-contiguous blocks or contiguous blocks, taking into account the deployment scenarios, the network bandwidth, channel loading, etc. The configuration can be indicated to each UE via high layer signaling. In case of aperiodic CSI or HARQ-ACK transmissions, a dynamic indication of the resource allocation via downlink control information (DCI) can additionally be applied as well.

In one example, the described techniques can be extended straightforwardly to cases in which the number of subcarriers, the sequence length and the number of PRBs are different than in the examples described above.

In one configuration, various designs for NR long PUCCH are described. Each long PUCCH can carry a different type or payload size of UCI, and the number of DMRS symbols within each PUCCH transmission can vary in accordance with the length of the NR PUCCH transmission.

In one example, with respect to a NR long PUCCH for carrying 1~2 bits HARQ-ACK, there can be floor(x/2) DMRS symbols for the PUCCH length x. Generally speaking, the floor function is a function that takes as input a real number x and provides as output the greatest integer less than or equal to x. In this example, two DMRS symbols can be configured at the middle, when the PUCCH length is four symbols. In addition, when PUCCH transmission changes frequency during the transmission, two DMRS symbols can be configured in one transmission of the PUCCH with five symbols, and three DMRS symbols can be configured in the other transmission of the PUCCH with seven symbols, in case that the PUCCH length is twelve OFDM symbols.

In one example, with respect to a NR long PUCCH for carrying 1 bit SR, a length-12 sequence can be mapped on each DFT-s-OFDM symbol without any DMRS symbol. The PUCCHs for 1 bit SR and 1~2 bits HARQ-ACK with the same PUCCH length can be multiplexed within the same PRB using different cyclic shifts of the same CAZAC sequence.

In one example, with respect to a NR long PUCCH for carrying up to a few tens of UCI bits, floor(x/3) DMRS symbols for length x of the NR PUCCH can be used to carry up to the few tens of UCI bits. The PUCCH transmission can apply an orthogonal cover code (OCC) over the PUCCH symbols and the subcarriers within each symbol to carry different UCI modulation symbols. The length of the orthogonal cover code can change in accordance with the PUCCH length. Two or more PRBs can be configured in case that the number of UCI bits exceeds a certain threshold. One DMRS symbol can be configured at a middle, in case that the PUCCH length is four symbols. In addition, when the PUCCH transmission changes frequency during the transmission, one DMRS symbol can be configured in one transmission of the PUCCH with five symbols, and two DMRS symbols can be configured in the other transmission of the PUCCH with seven symbols, in case that the PUCCH length is twelve OFDM symbols.

In one configuration, a duration of the long PUCCH can vary depending on the presence and duration of other physical channels. For example, as shown in FIG. 1, the PDCCH and the short PUCCH can be one OFDM symbol in duration. In another case, the short PUCCH may not be present in the slot, and the duration of the long PUCCH can be one more symbol. In other cases, either the PDCCH or the short PUCCH can have two OFDM symbols, and the duration of the long PUCCH can become shorter. Also, as an alternative, the duration of the slot can be reduced by half, which can result in only having half of the OFDM symbols within the slot, and as a result, the duration of the long PUCCH can shrink accordingly and have fewer symbols. The structure of the long PUCCH, in terms of the UCI and the DMRS, which aids the receiver in recovering a received signal and detecting the UCI, can be designed so that performance and resource efficiency of long PUCCH are robust against the change in the duration of long PUCCH.

In one example, multiple types of UCI can be defined in the uplink, such as HARQ-ACK, channel state information (CSI), SR, beam information (BI), etc. One or more of the different UCI types can be sent using the PUCCH by the UEs. The UCI combinations and the number of information bits carried by the PUCCH can vary depending on the situation and can be configured and controlled by the network.

In one example, in order to accommodate and support various deployment scenarios, channel configurations and situations, multiple PUCCH formats can be defined. Each of the formats can be designed taking into account, but is not limited to, a target payload size and target UCI type to be carried via the PUCCH format, and the UCI and DMRS structure can be designed to adapt to a change in the duration of the long PUCCH.

FIG. 7 is an example of a table of long physical uplink control channel (PUCCH) formats. A PUCCH format 0 can correspond to a payload size of 1 bit, a UCI type of SR, a modulation type of OOK, one PRB, and a length-12 sequence per DFT-s-OFDM symbol. A PUCCH format 1 can correspond to a payload size of 1 or 2 bits, a UCI type of HARQ-ACK, a modulation type of BPSK/QPSK, one PRB, and floor(x/2) DMRS symbols for length x, length-12 sequence per DFT-s-OFDM symbol. A PUCCH format 2 can correspond to a payload size of a few tens of bits, any UCI type and combination, a modulation type of QPSK, approximately two PRBs, and floor(x/3) DMRS symbols for length x. A PUCCH format 3 can correspond to a payload size of a few hundreds of bits, any UCI type and combination, a modulation type of QPSK, an adaptable number of PRBs, and dynamic switching between Format 2 and 3, and no UE multiplexing within a PRB.

Figure 8:
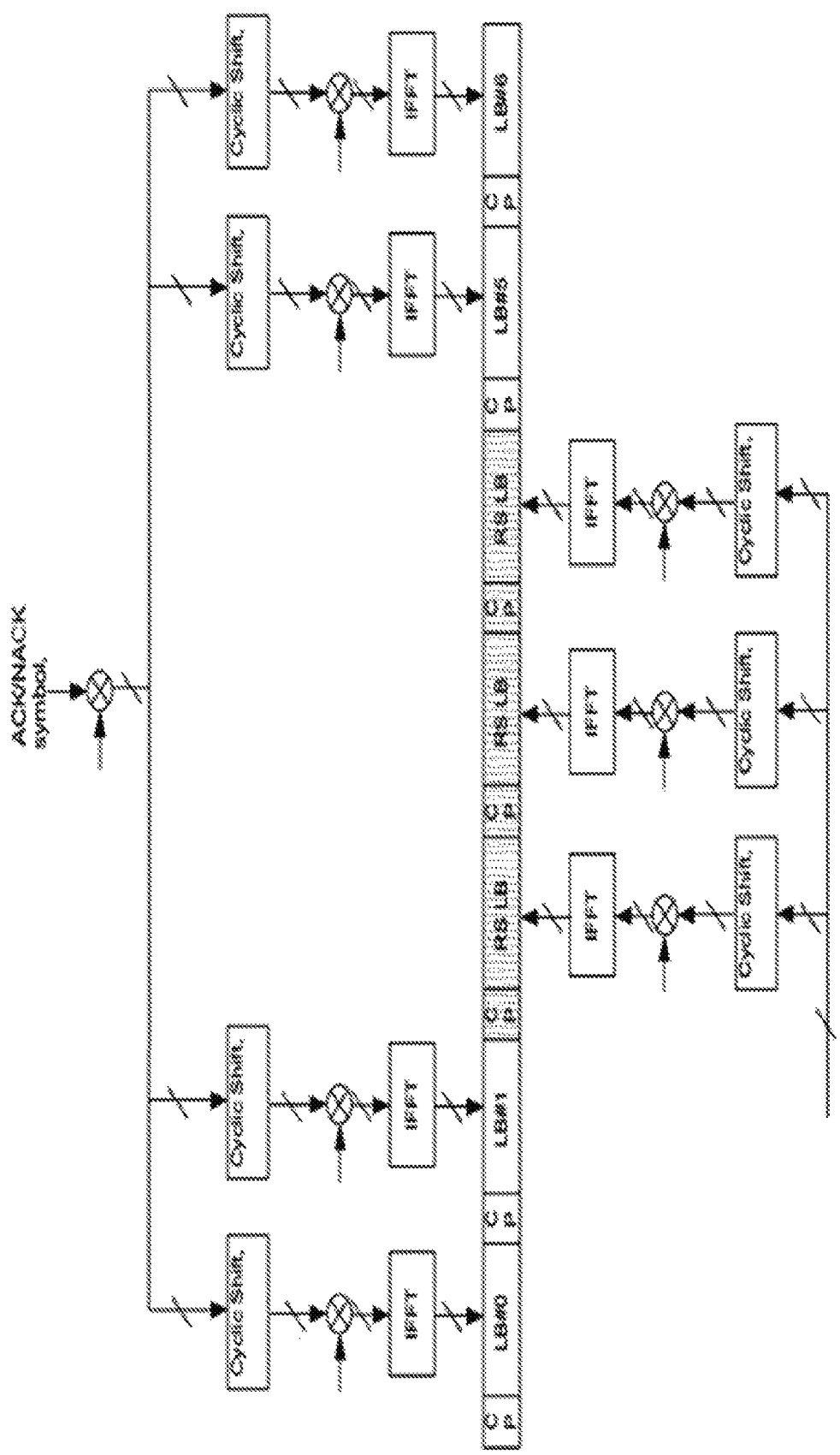
FIG. 8 illustrates a long physical uplink control channel (PUCCH) that carries one or two hybrid automatic repeat request acknowledgement (HARQ-ACK) bits in accordance with an example.

FIG. 8 illustrates an example of a long PUCCH that carries one or two HARQ-ACK bits. In this example, a long duration PUCCH format 1 for carrying 1~2 HARQ-ACK bits can indicate decoding success/failure for a received DL data to the gNB. As shown in FIG. 8, an exemplary structure of the long PUCCH can be provided for the case that the PUCCH duration is seven DFT-s-OFDM symbols. Each DFT-s-OFDM symbol can carry a length-12 CAZAC sequence and the sequence for UCI can be modulated by a HARQ-ACK modulation symbol. For PUCCHs to carry 1~2 UCI bits, about ½ DMRS overhead can provide a favorable performance. Therefore, as shown in FIG. 8, among the seven DFT-s-OFDM symbols within the PUCCH duration, three DFT-s-OFDM symbols at the middle can be used for the DMRS.

In one example, in order to achieve reliable performance for the PUCCH detection at the gNB receiver, it can be beneficial to adjust the number of DMRS symbols depending on the length of the long PUCCH. Specifically, the HARQ-ACK PUCCH can be configured such that floor(x/2) DMRS symbols are assigned for the PUCCH length x.

Figure 9A:
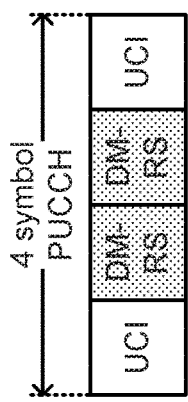
FIGS. 9A, 9B and 9C illustrate a demodulation reference signal (DMRS) structure for a long physical uplink control channel (PUCCH) that carries one or two hybrid automatic repeat request acknowledgement (HARQ-ACK) bits in accordance with an example.
Figure 9B:
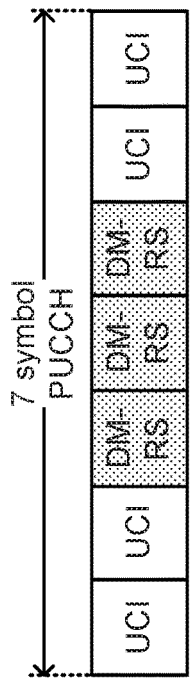
Figure 9C:
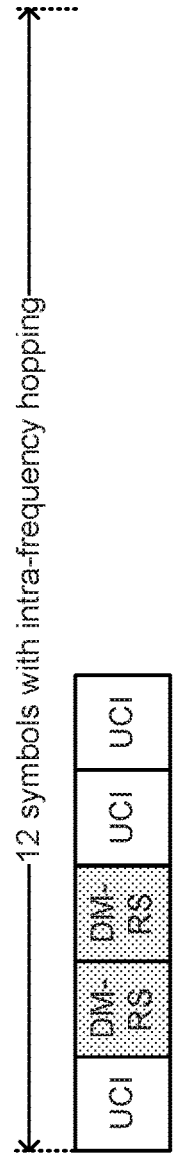

FIGS. 9A, 9B and 9C illustrate examples of a DMRS structure for a long PUCCH that carries one or two HARQ-ACK bits. As shown in FIG. 9A, two DMRS symbols can be configured at the middle, in the case in which the PUCCH length is four DFT-s-OFDM symbols. As shown in FIG. 9B, three DMRS symbols can be configured at the middle, in the case in which the PUCCH length is seven DFT-s-OFDM symbols. The configuration shown in FIG. 9B corresponds to the structure shown in FIG. 8 (i.e., a long duration PUCCH that comprises seven DFT-s-OFDM symbols, where the middle 3 DFT-s-OFDM symbols correspond to the DMRS and the first two DFT-s-OFDM symbols and the last two DFT-s-OFDM symbols correspond to UCI). As shown in FIG. 9C, a PUCCH transmission can change frequency during the transmission. In this example, the two transmissions can be sent on different PRBs which can lead to larger frequency diversity gain. Two DMRS symbols can be configured in the first transmission of the PUCCH with five DFT-s-OFDM symbols, and three DMRS symbols may be configured in the next transmission of the PUCCH with seven DFT-s-OFDM symbols.

Figure 10A:
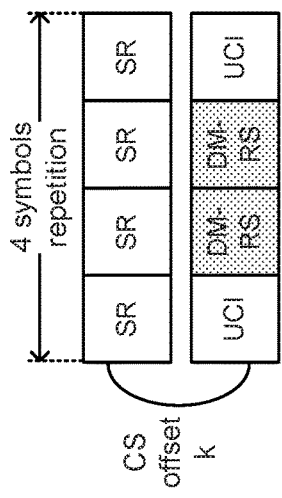
FIGS. 10A, 10B and 10C illustrate a long physical uplink control channel (PUCCH) that carries a one-bit scheduling request (SR) in accordance with an example.
Figure 10B:
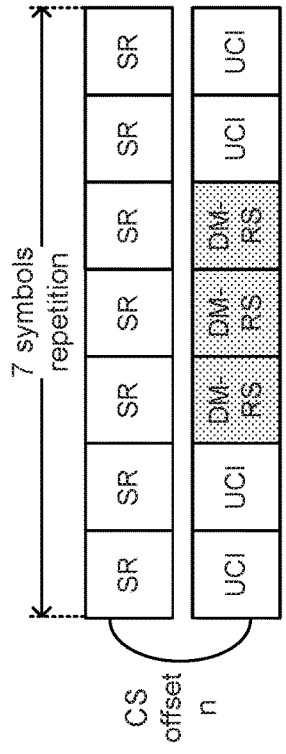
Figure 10C:
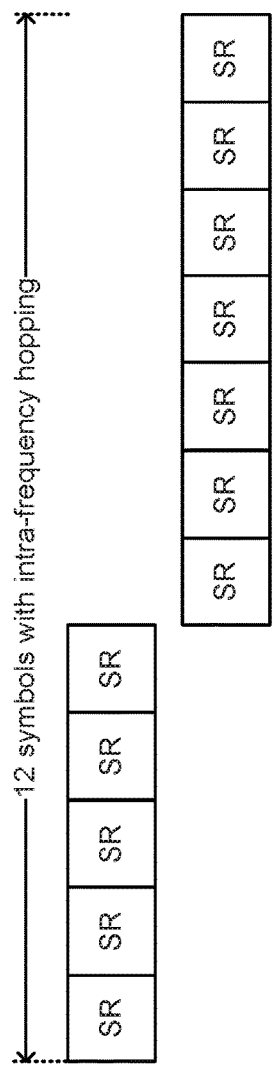

FIGS. 10A, 10B and 10C illustrate examples of a long PUCCH that carries a one-bit SR. In this example, a long duration PUCCH format 0 can be used to carry the 1 bit SR. Here, the SR PUCCH does not contain DMRS, and a length-12 sequence can be mapped on each DFT-s-OFDM symbol. In addition, the number of DFT-s-OFDM symbols can vary in accordance with the PUCCH length.

As shown in FIG. 10A, the PUCCHs for 1 bit SR and 1~2 bits HARQ-ACK with the same PUCCH length of 4 DFT-s-OFDM symbols can be multiplexed within the same PRB using different cyclic shifts (e.g., CS offset k) of the same CAZAC sequence. As shown in FIG. 10B, the PUCCHs for 1 bit SR and 1~2 bits HARQ-ACK with the same PUCCH length of 7 DFT-s-OFDM symbols can be multiplexed within the same PRB using different cyclic shifts (e.g., CS offset n) of the same CAZAC sequence. In one example, in the case in which the PUCCH length is longer than seven DFT-s-OFDM symbols, the PUCCH transmission can change frequency during the transmission, as shown in FIG. 10C. In this example, each of the two SR PUCCH transmissions can be multiplexed within the same PRB with HARQ-ACK PUCCH transmissions whose transmission length and frequency hopping timing are aligned, as shown in FIG. 10C. In this case, the two SR PUCCH transmissions can span 12 DFT-s-OFDM symbols with intra-frequency hopping. In addition, for both HARQ-ACK and SR PUCCHs, different UEs can be multiplexed within the same PRB using different cyclic shifts between the PUCCH transmissions from different UEs.

In one example, for a long PUCCH that is carrying up to a few tens of UCI bits, it may be important that even when the PUCCH length is short, e.g., four DFT-s-OFDM symbols, a UE is able to transmit up to a few tens of UCI bits.

Figure 11:
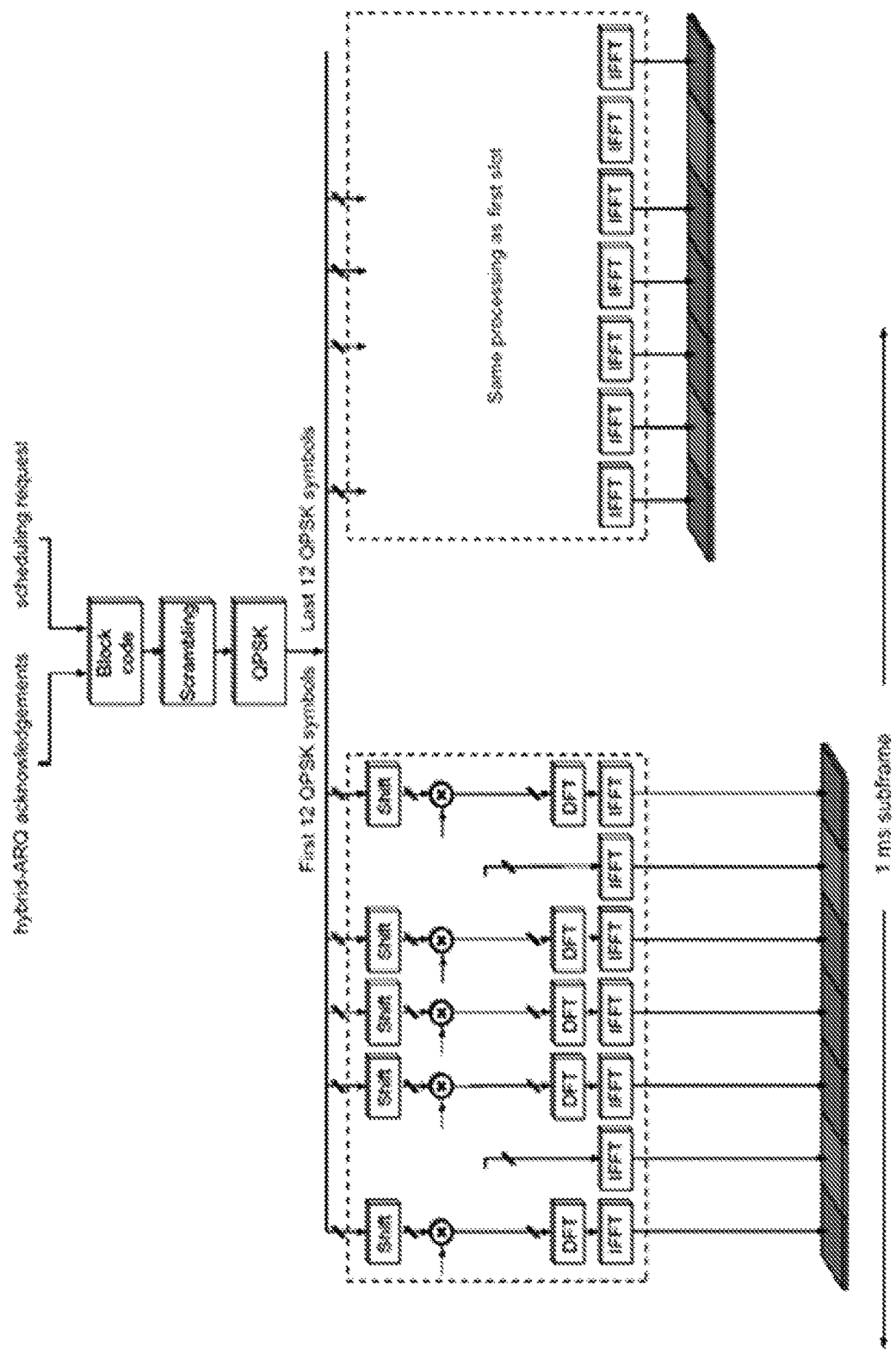
FIG. 11 illustrates a long physical uplink control channel (PUCCH) that carries up to a few tens of bits of uplink control information (UCI) in accordance with an example.

FIG. 11 illustrates an example of a long PUCCH that carries up to a few tens of UCI bits. In this example, a long duration PUCCH format 2 can be used to carry the few tens of UCI bits. The PUCCH transmission can apply orthogonal cover codes (OCCs) over the PUCCH symbols and each DFT-s-OFDM symbol for UCI can carry the same set of twelve UCI modulation symbols, where the twelve UCI modulation symbols can be mapped on the respective twelve subcarriers within one PRB of each symbol, and the first and second half of the PUCCH transmissions can carry a different set of twelve modulation symbols. Removing or adding one DFT-s-OFDM symbol in each half does not change the number of UCI modulation symbols which are carried by the PUCCH. In order to further increase the capacity of the PUCCH, two or more PRBs can be configured in a frequency contiguous or non-contiguous manner, in case that the number of UCI bits exceeds a certain threshold. Then, each PRB can carry different UCI modulation symbols, and orthogonal cover codes can be separately applied on each PRB.

In one example, for PUCCHs to carry up to a few tens of UCI bits, an approximately ⅓ DMRS overhead can provide an optimum performance. In this regard, the PUCCH can be configured such that floor(x/3) DMRS symbols are assigned for the PUCCH length x.

Figure 12A:
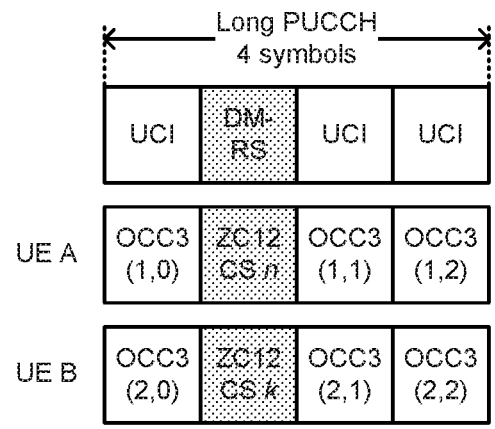
FIGS. 12A, 12B and 12C illustrate a demodulation reference signal (DMRS) structure for a long physical uplink control channel (PUCCH) that carries up to a few tens of bits of uplink control information (UCI) in accordance with an example.
Figure 12B:
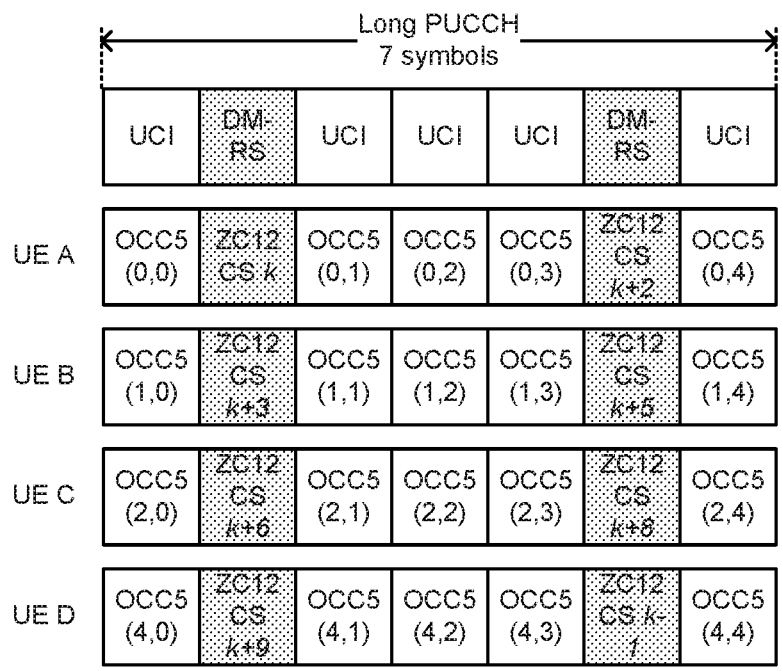
Figure 12C:
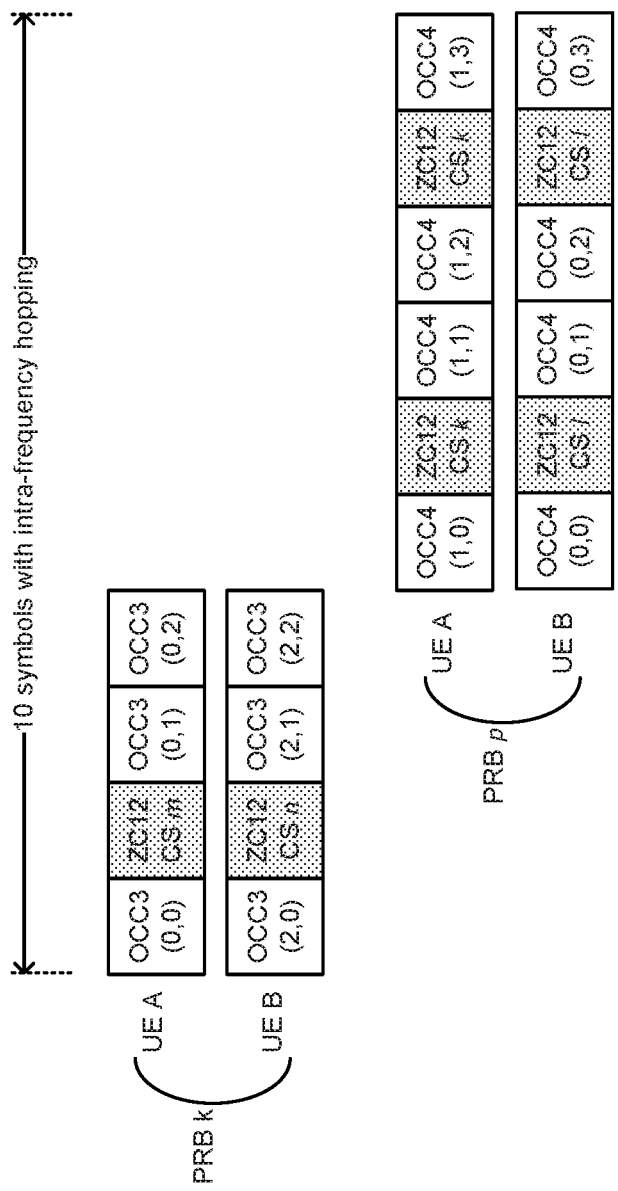

FIGS. 12A, 12B and 12C illustrate examples of a DMRS structure for a long PUCCH that carries up to a few tens of UCI bits. In these examples, a long duration PUCCH format 2 can be used to carry the few tens of UCI bits. As shown in FIG. 12A, one DMRS symbol can be configured at the middle in the case in which the PUCCH length is four DFT-s-OFDM symbols. As shown in FIG. 12B, two DMRS symbols can be configured in the case in which the PUCCH length is seven DFT-s-OFDM symbols. As shown in FIG.

12C, the PUCCH transmission can change frequency during the transmission. In this example, two transmissions can be sent on different PRBs, giving larger frequency diversity gain. One DMRS symbol can be configured in the first transmission of the PUCCH with four DFT-s-OFDM symbols, and two DMRS symbols may be configured in the second transmission of the PUCCH with six DFT-s-OFDM symbols. Thus, the two transmissions can span ten DFT-s-OFDM symbols with intra-frequency hopping.

As shown in FIGS. 12A, 12B and 12C, the transmission from different UEs can be multiplexed by employing different orthogonal cover codes on UCI symbols and employing different cyclic shift for the DMRS sequences. In doing so, the length of the orthogonal cover code can change in accordance with the PUCCH length. For example, as shown in FIG. 12A, the length of the orthogonal cover code can be 3 and for UEs A and B, orthogonal cover codes 1 and 2 are assigned and cyclic shifts n and k are used, respectively. As shown in FIG. 12C, in the case in which frequency hopping is applied between the two transmissions, the orthogonal cover code length can be adjusted in accordance with the length of each transmission, and UE multiplexing can be performed in each transmission by assigning different orthogonal cover codes and cyclic shifts between the UEs.

In one example, a long duration PUCCH format 3 can be used to carry a few hundreds of UCI bits. For the long PUCCH that carries up to the few hundreds of UCI bits, a structure applied to the PUSCH can be utilized. That is, depending on a desired payload size, a different number of PRBs can be used for the PUCCH transmission. In addition, depending on the payload size, the UE can switch the PUCCH structure between Format 2 and Format 3.

In one configuration, a technique for wireless communication in a 5G NR system is described. A UE can transmit DMRS symbols associated with a NR PUCCH, where the NR PUCCH can configure a different number of DMRS symbols depending on a length of the NR PUCCH.

In one example, the number of the DMRS symbols can be floor(x/2) DMRS symbols for length x of the NR PUCCH to carry 1~2 bits HARQ-ACK. In another example, two DMRS symbols can be configured at the middle, for the case in which the PUCCH length is four symbols. In yet another example, the PUCCH transmission can change frequency during transmission, and two DMRS symbols can be configured in one transmission of the PUCCH with five symbols, and three DMRS symbols can be configured in the other transmission of the PUCCH with seven symbols, for the case in which the PUCCH length is twelve OFDM symbols.

In one example, the number of the DMRS symbols can be floor(x/3) DMRS symbols for length x of the NR PUCCH to carry up to a few tens of UCI bits. In another example, the PUCCH transmission can apply an orthogonal cover code over the PUCCH symbols and the subcarriers within each symbol can carry different UCI modulation symbols. In yet another example, two PRBs can be configured in case that the number of UCI bits exceeds a certain threshold. In a further example, one DMRS symbol can be configured at a middle, for the case in which the PUCCH length is four symbols. In yet a further example, the PUCCH transmission can change frequency during the transmission, and one DMRS symbol can be configured in one transmission of the PUCCH with five symbols, and two DMRS symbols can be configured in the other transmission of the PUCCH with seven symbols, for the case in which the PUCCH length is twelve OFDM symbols.

Figure 13:
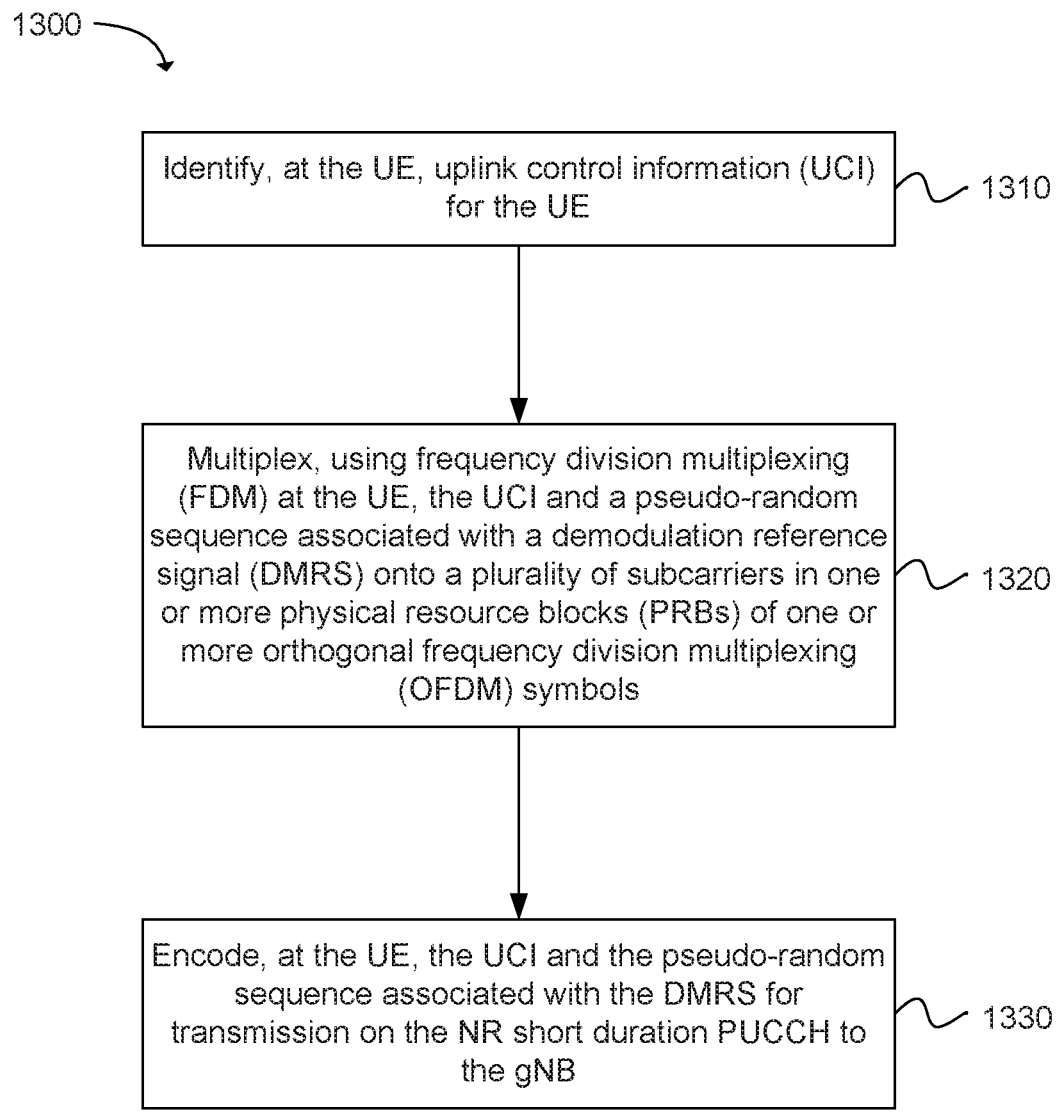
FIG. 13 depicts functionality of a user equipment (UE) operable to encode a New Radio (NR) short duration physical uplink control channel (PUCCH) for transmission to a Next Generation NodeB (gNB) in accordance with an example.

Another example provides functionality 1300 of a user equipment (UE) operable to encode a New Radio (NR) short duration physical uplink control channel (PUCCH) for transmission to a Next Generation NodeB (gNB), as shown in FIG. 13. The UE can comprise one or more processors configured to identify, at the UE, uplink control information (UCI) for the UE, as in block 1310. The UE can comprise one or more processors configured to multiplex, using frequency division multiplexing (FDM) at the UE, the UCI and a pseudo-random sequence associated with a demodulation reference signal (DMRS) onto a plurality of subcarriers in one or more physical resource blocks (PRBs) of one or more orthogonal frequency division multiplexing (OFDM) symbols, as in block 1320. The UE can comprise one or more processors configured to encode, at the UE, the UCI and the pseudo-random sequence associated with the DMRS for transmission on the NR short duration PUCCH to the gNB, as in block 1330. In addition, the UE can comprise a memory interface configured to retrieve from a memory the UCI.

Figure 14:
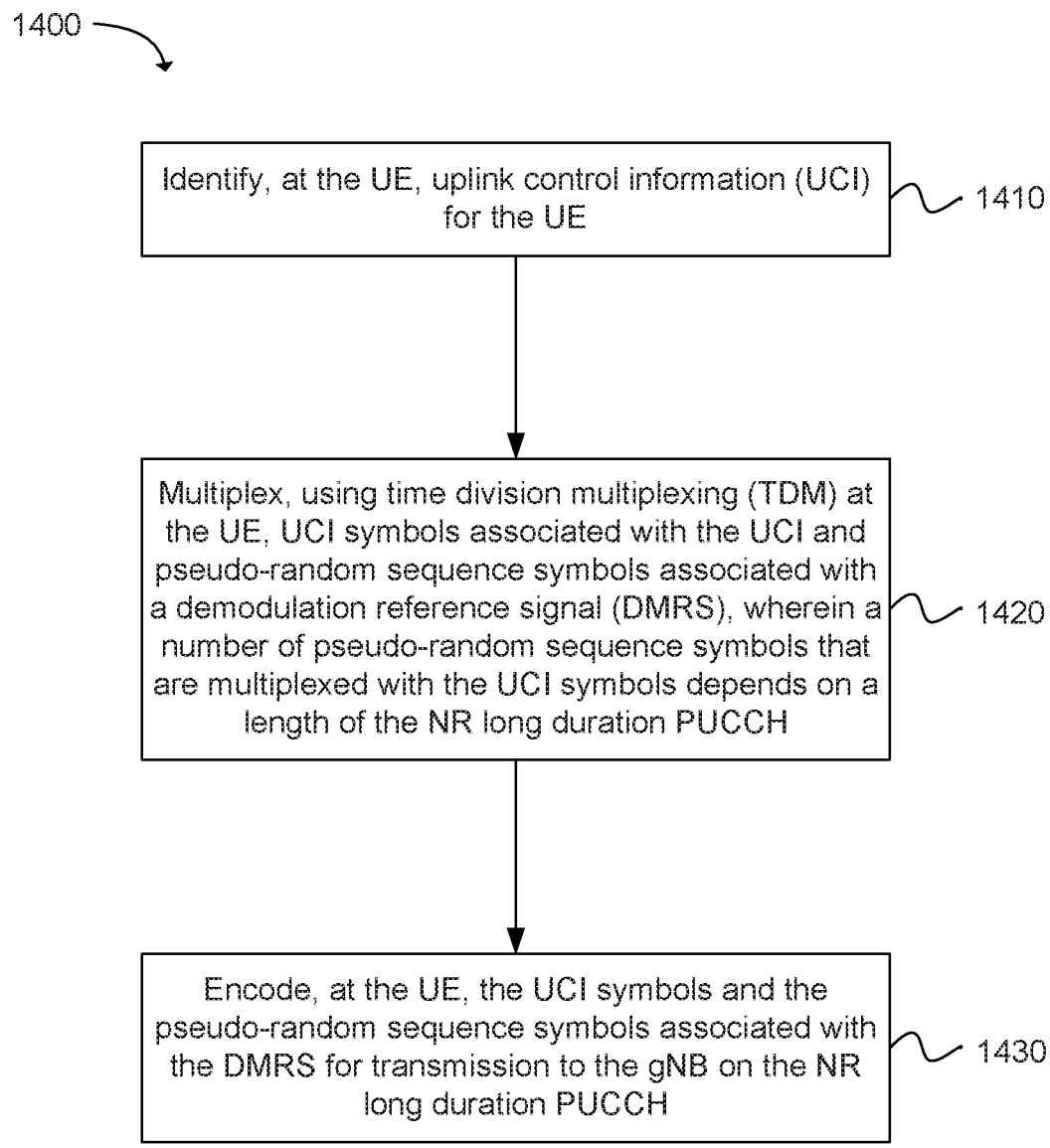
FIG. 14 depicts functionality of a user equipment (UE) operable to encode a New Radio (NR) long duration physical uplink control channel (PUCCH) for transmission to a Next Generation NodeB (gNB) in accordance with an example.

Another example provides functionality 1400 of a user equipment (UE) operable to encode a New Radio (NR) long duration physical uplink control channel (PUCCH) for transmission to a Next Generation NodeB (gNB), as shown in FIG. 14. The UE can comprise one or more processors configured to identify, at the UE, uplink control information (UCI) for the UE, as in block 1410. The UE can comprise one or more processors configured to multiplex, using time division multiplexing (TDM) at the UE, UCI symbols associated with the UCI and pseudo-random sequence symbols associated with a demodulation reference signal (DMRS), wherein a number of pseudo-random sequence symbols that are multiplexed with the UCI symbols depends on a length of the NR long duration PUCCH, as in block 1420. The UE can comprise one or more processors configured to encode, at the UE, the UCI symbols and the pseudo-random sequence symbols associated with the DMRS for transmission to the gNB on the NR long duration PUCCH, as in block 1430. In addition, the UE can comprise a memory interface configured to retrieve from a memory the UCI.

Figure 15:
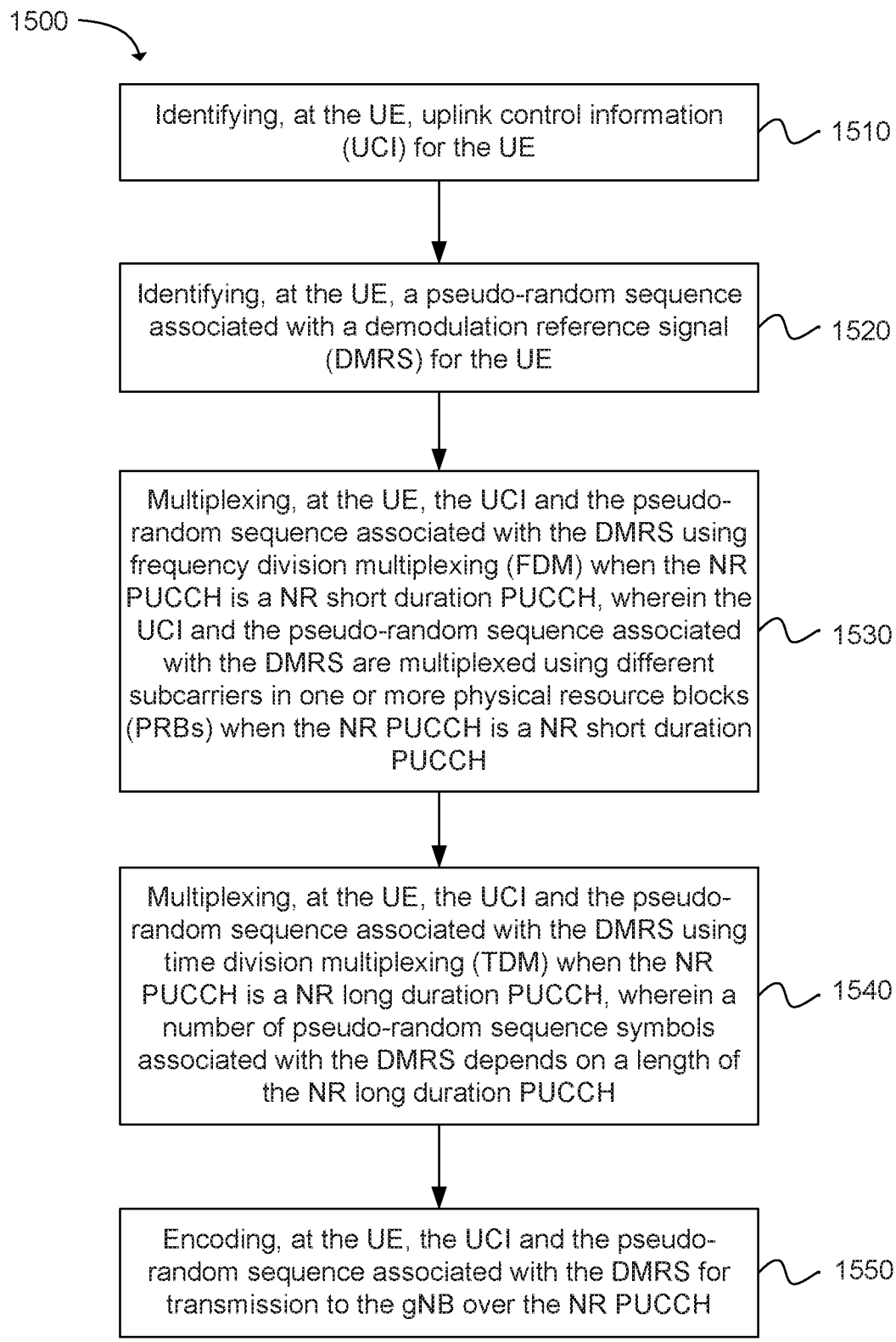
FIG. 15 depicts a flowchart of a machine readable storage medium having instructions embodied thereon for encoding a New Radio (NR) physical uplink control channel (PUCCH) for transmission from a user equipment (UE) to a Next Generation NodeB (gNB) in accordance with an example.
Figure 16:
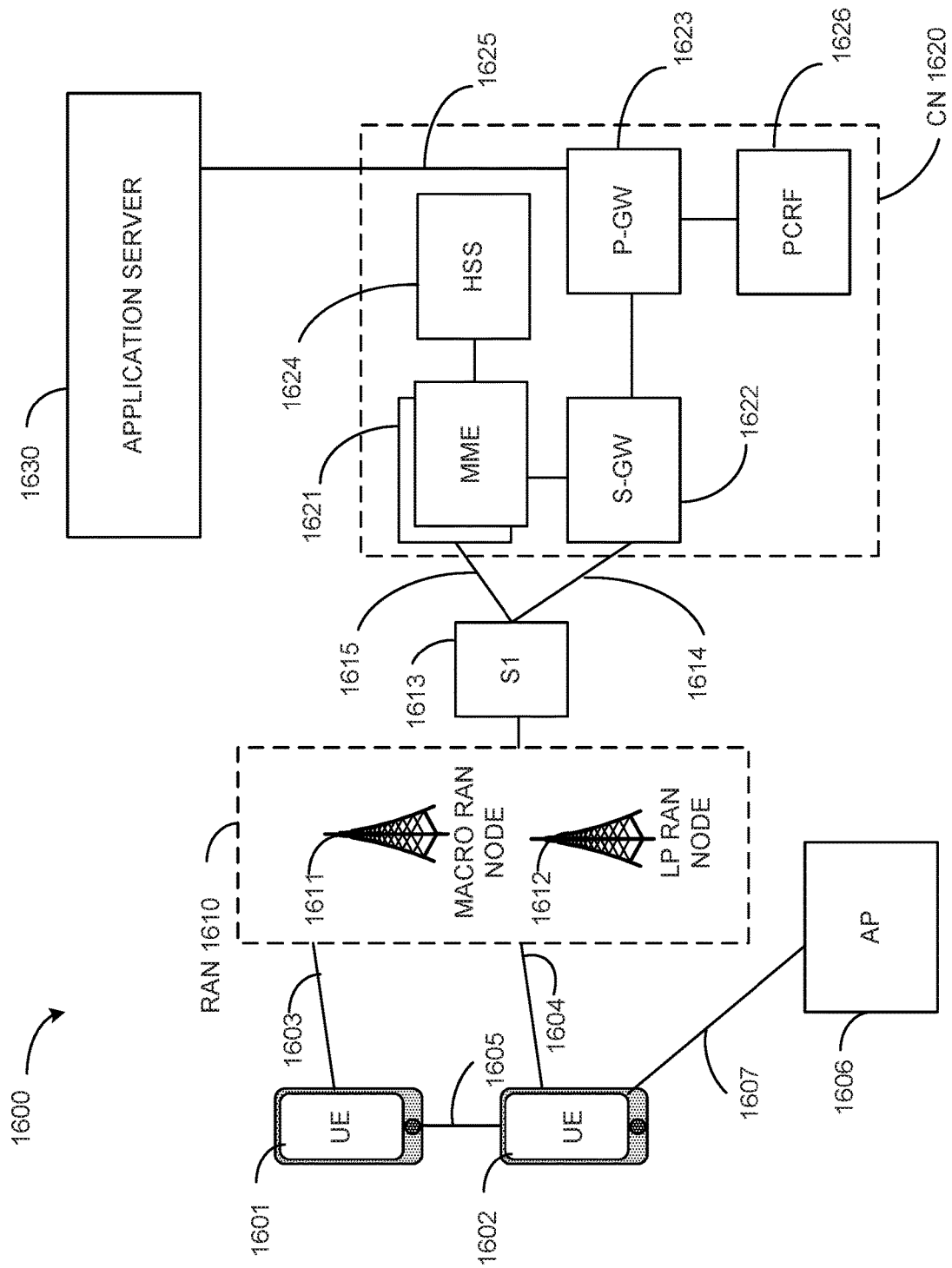
FIG. 16 illustrates an architecture of a wireless network in accordance with an example.

Another example provides at least one machine readable storage medium having instructions 1500 embodied thereon for encoding a New Radio (NR) physical uplink control channel (PUCCH) for transmission from a user equipment (UE) to a Next Generation NodeB (gNB), as shown in FIG. 15. The instructions can be executed on a machine, where the instructions are included on at least one computer readable medium or one non-transitory machine readable storage medium. The instructions when executed by one or more processors of a user equipment (UE) perform: identifying, at the UE, uplink control information (UCI) for the UE, as in block 1510. The instructions when executed by one or more processors of the UE perform: identifying, at the UE, a pseudo-random sequence associated with a demodulation reference signal (DMRS) for the UE, as in block 1520. The instructions when executed by one or more processors of the UE perform: multiplexing, at the UE, the UCI and the pseudo-random sequence associated with the DMRS using frequency division multiplexing (FDM) when the NR PUCCH is a NR short duration PUCCH, wherein the UCI and the pseudo-random sequence associated with the DMRS are multiplexed using different subcarriers in one or more physical resource blocks (PRBs) when the NR PUCCH is a NR short duration PUCCH, as in block 1530. The instructions when executed by one or more processors of the UE perform: multiplexing, at the UE, the UCI and the pseudo-random sequence associated with the DMRS using time division multiplexing (TDM) when the NR PUCCH is a NR long duration PUCCH, wherein a number of pseudo-random sequence symbols associated with the DMRS depends on a length of the NR long duration PUCCH, as in block 1540. The instructions when executed by one or more processors of the UE perform: encoding, at the UE, the UCI multiplexed and the pseudo-random sequence associated with the DMRS for transmission to the gNB over the NR PUCCH, as in block 1550.

Figure 17:
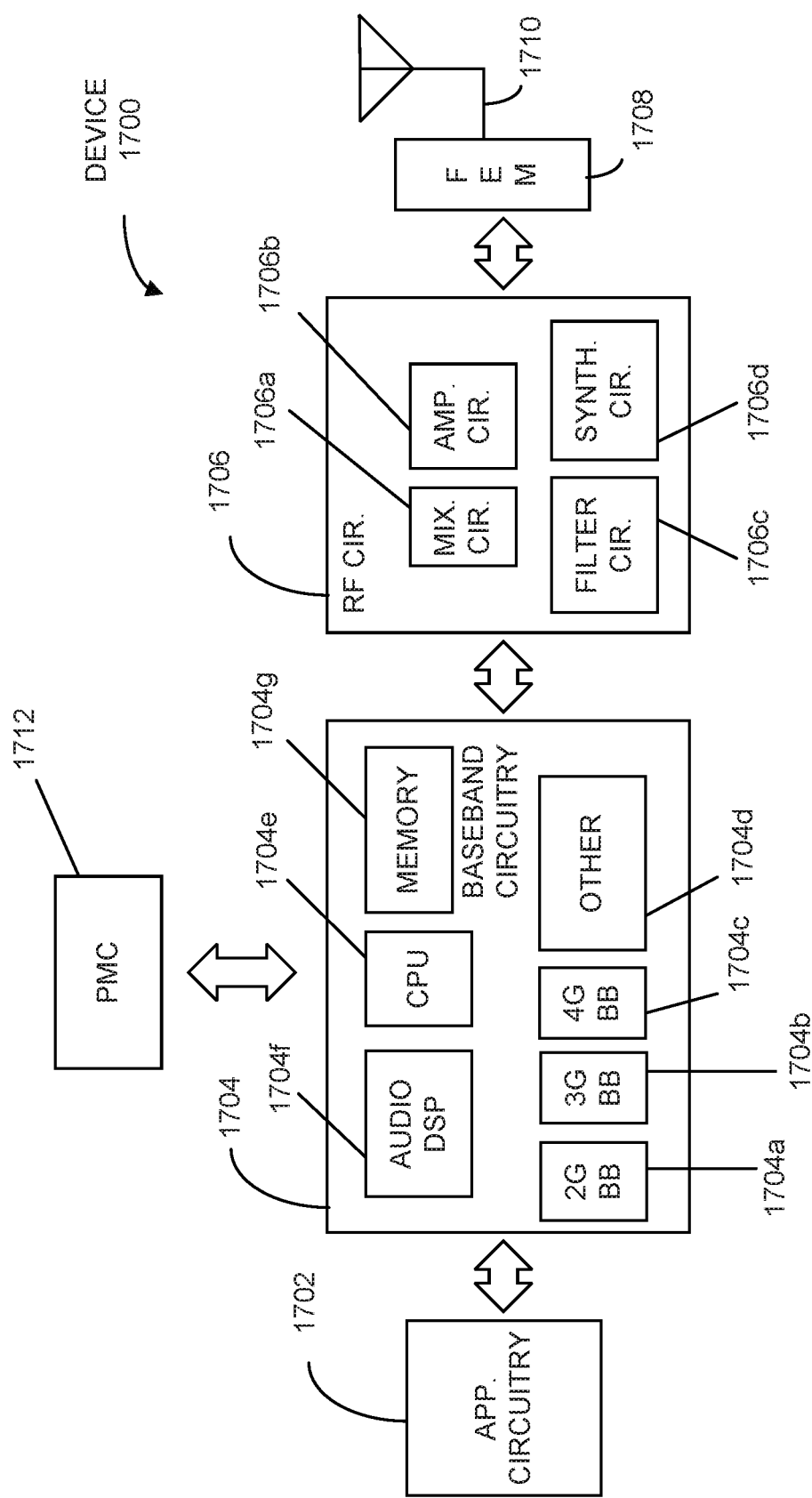
FIG. 17 illustrates a diagram of a wireless device (e.g., UE) in accordance with an example.

FIG. 17 illustrates an architecture of a system 700 of a network in accordance with some embodiments. The system 700 is shown to include a user equipment (UE) 1701 and a UE 1702. The UEs 1701 and 1702 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 1701 and 1702 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 1701 and 1702 may be configured to connect, e.g., communicatively couple, with a radio access network (RAN) 1710—the RAN 1710 may be, for example, an Evolved Universal Mobile Telecommunications System (UMTS) Terrestrial Radio Access Network (E-UTRAN), a NextGen RAN (NG RAN), or some other type of RAN. The UEs 1701 and 1702 utilize connections 1703 and 1704, respectively, each of which comprises a physical communications interface or layer (discussed in further detail below); in this example, the connections 1703 and 1704 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 1701 and 1702 may further directly exchange communication data via a ProSe interface 1705. The ProSe interface 1705 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 1702 is shown to be configured to access an access point (AP) 1706 via connection 1707. The connection 1707 can comprise a local wireless connection, such as a connection consistent with any IEEE 1802.15 protocol, wherein the AP 1706 would comprise a wireless fidelity (WiFi®) router. In this example, the AP 1706 is shown to be connected to the Internet without connecting to the core network of the wireless system (described in further detail below).

The RAN 1710 can include one or more access nodes that enable the connections 1703 and 1704. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 1710 may include one or more RAN nodes for providing macrocells, e.g., macro RAN node 1711, and one or more RAN nodes for providing femtocells or picocells (e.g., cells having smaller coverage areas, smaller user capacity, or higher bandwidth compared to macrocells), e.g., low power (LP) RAN node 1712.

Any of the RAN nodes 1711 and 1712 can terminate the air interface protocol and can be the first point of contact for the UEs 1701 and 1702. In some embodiments, any of the RAN nodes 1711 and 1712 can fulfill various logical functions for the RAN 1710 including, but not limited to, radio network controller (RNC) functions such as radio bearer management, uplink and downlink dynamic radio resource management and data packet scheduling, and mobility management.

In accordance with some embodiments, the UEs 1701 and 1702 can be configured to communicate using Orthogonal Frequency-Division Multiplexing (OFDM) communication signals with each other or with any of the RAN nodes 1711 and 1712 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 1711 and 1712 to the UEs 1701 and 1702, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 1701 and 1702. The physical downlink control channel (PDCCH)

may carry information about the transport format and resource allocations related to the PDSCH channel, among other things. It may also inform the UEs 1701 and 1702 about the transport format, resource allocation, and H-ARQ (Hybrid Automatic Repeat Request) information related to the uplink shared channel. Typically, downlink scheduling (assigning control and shared channel resource blocks to the UE 1702 within a cell) may be performed at any of the RAN nodes 1711 and 1712 based on channel quality information fed back from any of the UEs 1701 and 1702. The downlink resource assignment information may be sent on the PDCCH used for (e.g., assigned to) each of the UEs 1701 and 1702.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 18).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 1710 is shown to be communicatively coupled to a core network (CN) 1720—via an S1 interface 1713. In embodiments, the CN 1720 may be an evolved packet core (EPC) network, a NextGen Packet Core (NPC) network, or some other type of CN. In this embodiment the S1 interface 1713 is split into two parts: the S1-U interface 1714, which carries traffic data between the RAN nodes 1711 and 1712 and the serving gateway (S-GW) 1722, and the S1-mobility management entity (MME) interface 1715, which is a signaling interface between the RAN nodes 1711 and 1712 and MMEs 1721.

In this embodiment, the CN 1720 comprises the MMEs 1721, the S-GW 1722, the Packet Data Network (PDN) Gateway (P-GW) 1723, and a home subscriber server (HSS) 1724. The MMEs 1721 may be similar in function to the control plane of legacy Serving General Packet Radio Service (GPRS) Support Nodes (SGSN). The MMEs 1721 may manage mobility aspects in access such as gateway selection and tracking area list management. The HSS 1724 may comprise a database for network users, including subscription-related information to support the network entities' handling of communication sessions. The CN 1720 may comprise one or several HSSs 1724, depending on the number of mobile subscribers, on the capacity of the equipment, on the organization of the network, etc. For example, the HSS 1724 can provide support for routing/roaming, authentication, authorization, naming/addressing resolution, location dependencies, etc.

The S-GW 1722 may terminate the S1 interface 1713 towards the RAN 1710, and routes data packets between the RAN 1710 and the CN 1720. In addition, the S-GW 1722 may be a local mobility anchor point for inter-RAN node handovers and also may provide an anchor for inter-3GPP mobility. Other responsibilities may include lawful intercept, charging, and some policy enforcement.

The P-GW 1723 may terminate an SGi interface toward a PDN. The P-GW 1723 may route data packets between the EPC network 1723 and external networks such as a network including the application server 1730 (alternatively referred to as application function (AF)) via an Internet Protocol (IP) interface 1725. Generally, the application server 1730 may be an element offering applications that use IP bearer resources with the core network (e.g., UMTS Packet Services (PS) domain, LTE PS data services, etc.). In this embodiment, the P-GW 1723 is shown to be communicatively coupled to an application server 1730 via an IP communications interface 1725. The application server 1730 can also be configured to support one or more communication services (e.g., Voice-over-Internet Protocol (VoIP) sessions, PTT sessions, group communication sessions, social networking services, etc.) for the UEs 1701 and 1702 via the CN 1720.

The P-GW 1723 may further be a node for policy enforcement and charging data collection. Policy and Charging Enforcement Function (PCRF) 1726 is the policy and charging control element of the CN 1720. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 1726 may be communicatively coupled to the application server 1730 via the P-GW 1723. The application server 1730 may signal the PCRF 1726 to indicate a new service flow and select the appropriate Quality of Service (QoS) and charging parameters. The PCRF 1726 may provision this rule into a Policy and Charging Enforcement Function (PCEF) (not shown) with the appropriate traffic flow template (TFT) and QoS class of identifier (QCI), which commences the QoS and charging as specified by the application server 1730.

Figure 18:
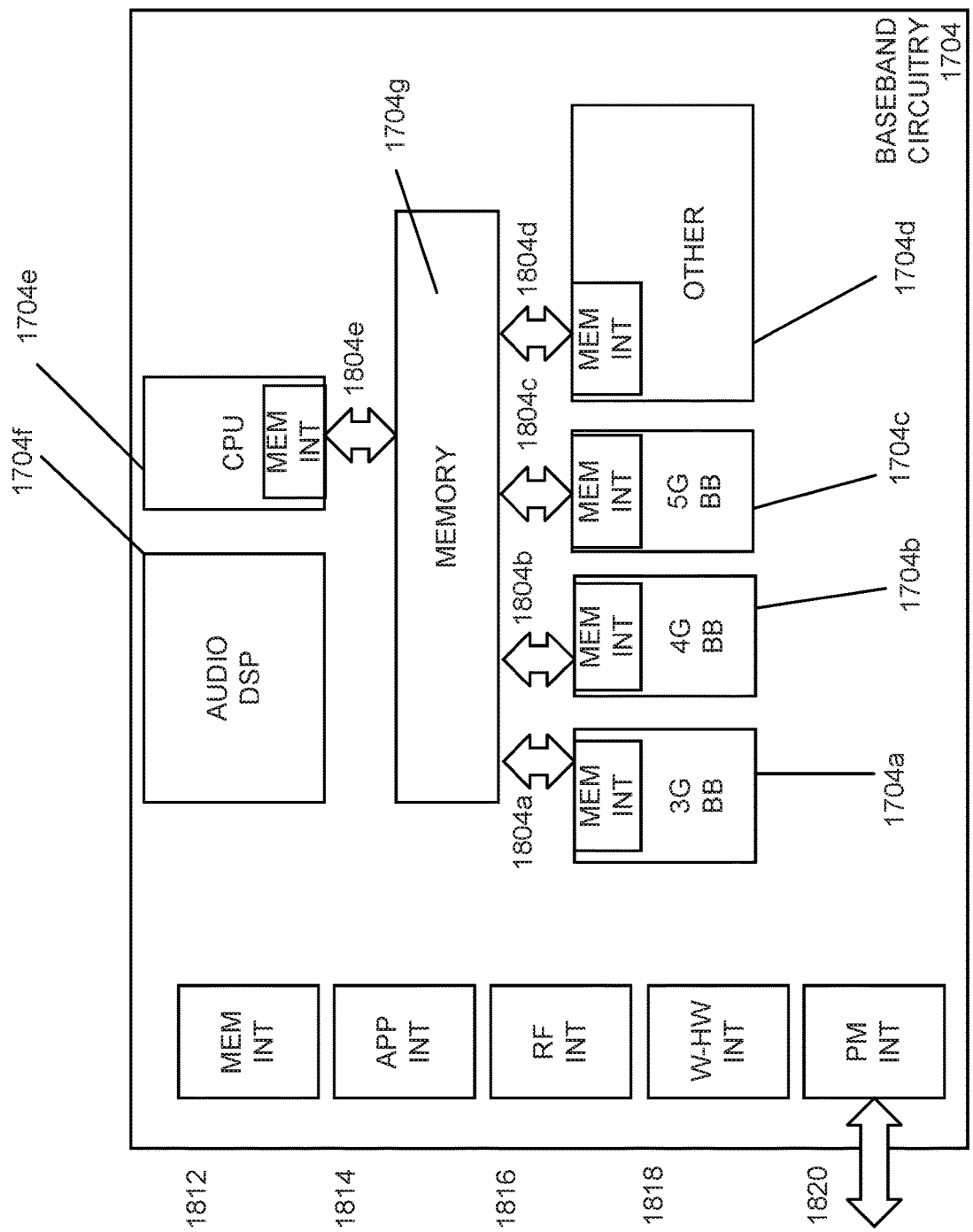
FIG. 18 illustrates interfaces of baseband circuitry in accordance with an example.

FIG. 18 illustrates example components of a device 1800 in accordance with some embodiments. In some embodiments, the device 1800 may include application circuitry 1802, baseband circuitry 1804, Radio Frequency (RF) circuitry 1806, front-end module (FEM) circuitry 1808, one or more antennas 1810, and power management circuitry (PMC) 1812 coupled together at least as shown. The components of the illustrated device 1800 may be included in a UE or a RAN node. In some embodiments, the device 1800 may include less elements (e.g., a RAN node may not utilize application circuitry 1802, and instead include a processor/controller to process IP data received from an EPC). In some embodiments, the device 1800 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1802 may include one or more application processors. For example, the application circuitry 1802 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1800. In some embodiments, processors of application circuitry 1802 may process IP data packets received from an EPC.

The baseband circuitry 1804 may include circuitry such as, but not limited to, one or more single-core or multi-core processors. The baseband circuitry 1804 may include one or more baseband processors or control logic to process baseband signals received from a receive signal path of the RF circuitry 1806 and to generate baseband signals for a transmit signal path of the RF circuitry 1806. Baseband processing circuitry 1804 may interface with the application circuitry 1802 for generation and processing of the baseband signals and for controlling operations of the RF circuitry 1806. For example, in some embodiments, the baseband circuitry 1804 may include a third generation (3G) baseband processor 1804a, a fourth generation (4G) baseband processor 1804b, a fifth generation (5G) baseband processor 1804c, or other baseband processor(s) 1804d for other existing generations, generations in development or to be developed in the future (e.g., second generation (2G), sixth generation (6G), etc.). The baseband circuitry 1804 (e.g., one or more of baseband processors 1804a-d) may handle various radio control functions that enable communication with one or more radio networks via the RF circuitry 1806. In other embodiments, some or all of the functionality of baseband processors 1804a-d may be included in modules stored in the memory 1804g and executed via a Central Processing Unit (CPU) 1804e. The radio control functions may include, but are not limited to, signal modulation/demodulation, encoding/decoding, radio frequency shifting, etc. In some embodiments, modulation/demodulation circuitry of the baseband circuitry 1804 may include Fast-Fourier Transform (FFT), precoding, or constellation mapping/demapping functionality. In some embodiments, encoding/decoding circuitry of the baseband circuitry 1804 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1804 may include one or more audio digital signal processor(s) (DSP) 1804f. The audio DSP(s) 1804f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1804 and the application circuitry 1802 may be implemented together such as, for example, on a system on a chip (SOC).

In some embodiments, the baseband circuitry 1804 may provide for communication compatible with one or more radio technologies. For example, in some embodiments, the baseband circuitry 1804 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 1804 is configured to support radio communications of more than one wireless protocol may be referred to as multi-mode baseband circuitry.

RF circuitry 1806 may enable communication with wireless networks using modulated electromagnetic radiation through a non-solid medium. In various embodiments, the RF circuitry 1806 may include switches, filters, amplifiers, etc. to facilitate the communication with the wireless network. RF circuitry 1806 may include a receive signal path which may include circuitry to down-convert RF signals received from the FEM circuitry 1808 and provide baseband signals to the baseband circuitry 1804. RF circuitry 1806 may also include a transmit signal path which may include circuitry to up-convert baseband signals provided by the baseband circuitry 1804 and provide RF output signals to the FEM circuitry 1808 for transmission.

In some embodiments, the receive signal path of the RF circuitry 1806 may include mixer circuitry 1806a, amplifier circuitry 1806b and filter circuitry 1806c. In some embodiments, the transmit signal path of the RF circuitry 1806 may include filter circuitry 1806c and mixer circuitry 1806a. RF circuitry 1806 may also include synthesizer circuitry 1806d for synthesizing a frequency for use by the mixer circuitry 1806a of the receive signal path and the transmit signal path. In some embodiments, the mixer circuitry 1806a of the receive signal path may be configured to down-convert RF signals received from the FEM circuitry 1808 based on the synthesized frequency provided by synthesizer circuitry 1806d. The amplifier circuitry 1806b may be configured to amplify the down-converted signals and the filter circuitry 1806c may be a low-pass filter (LPF) or band-pass filter (BPF) configured to remove unwanted signals from the down-converted signals to generate output baseband signals. Output baseband signals may be provided to the baseband circuitry 1804 for further processing. In some embodiments, the output baseband signals may be zero-frequency baseband signals, although this is not a necessity. In some embodiments, mixer circuitry 1806a of the receive signal path may comprise passive mixers, although the scope of the embodiments is not limited in this respect.

In some embodiments, the mixer circuitry 1806a of the transmit signal path may be configured to up-convert input baseband signals based on the synthesized frequency provided by the synthesizer circuitry 1806d to generate RF output signals for the FEM circuitry 1808. The baseband signals may be provided by the baseband circuitry 1804 and may be filtered by filter circuitry 1806c.

In some embodiments, the mixer circuitry 1806a of the receive signal path and the mixer circuitry 1806a of the transmit signal path may include two or more mixers and may be arranged for quadrature downconversion and upconversion, respectively. In some embodiments, the mixer circuitry 1806a of the receive signal path and the mixer circuitry 1806a of the transmit signal path may include two or more mixers and may be arranged for image rejection (e.g., Hartley image rejection). In some embodiments, the mixer circuitry 1806a of the receive signal path and the mixer circuitry 1806a may be arranged for direct downconversion and direct upconversion, respectively. In some embodiments, the mixer circuitry 1806a of the receive signal path and the mixer circuitry 1806a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1806 may include analog-to-digital converter (ADC) and digital-to-analog converter (DAC) circuitry and the baseband circuitry 1804 may include a digital baseband interface to communicate with the RF circuitry 1806.

In some dual-mode embodiments, a separate radio IC circuitry may be provided for processing signals for each spectrum, although the scope of the embodiments is not limited in this respect.

In some embodiments, the synthesizer circuitry 1806*d* may be a fractional-N synthesizer or a fractional N/N+1 synthesizer, although the scope of the embodiments is not limited in this respect as other types of frequency synthesizers may be suitable. For example, synthesizer circuitry 1806*d* may be a delta-sigma synthesizer, a frequency multiplier, or a synthesizer comprising a phase-locked loop with a frequency divider.

The synthesizer circuitry 1806*d* may be configured to synthesize an output frequency for use by the mixer circuitry 1806*a* of the RF circuitry 1806 based on a frequency input and a divider control input. In some embodiments, the synthesizer circuitry 1806*d* may be a fractional N/N+1 synthesizer.

In some embodiments, frequency input may be provided by a voltage controlled oscillator (VCO), although that is not a necessity. Divider control input may be provided by either the baseband circuitry 1804 or the applications processor 1802 depending on the desired output frequency. In some embodiments, a divider control input (e.g., N) may be determined from a look-up table based on a channel indicated by the applications processor 1802.

Synthesizer circuitry 1806*d* of the RF circuitry 1806 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1806*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1806 may include an IQ/polar converter.

FEM circuitry 1808 may include a receive signal path which may include circuitry configured to operate on RF signals received from one or more antennas 1810, amplify the received signals and provide the amplified versions of the received signals to the RF circuitry 1806 for further processing. FEM circuitry 1808 may also include a transmit signal path which may include circuitry configured to amplify signals for transmission provided by the RF circuitry 1806 for transmission by one or more of the one or more antennas 1810. In various embodiments, the amplification through the transmit or receive signal paths may be done solely in the RF circuitry 1806, solely in the FEM 1808, or in both the RF circuitry 1806 and the FEM 1808.

In some embodiments, the FEM circuitry 1808 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 1806). The transmit signal path of the FEM circuitry 1808 may include a power amplifier (PA) to amplify input RF signals (e.g., provided by RF circuitry 1806), and one or more filters to generate RF signals for subsequent transmission (e.g., by one or more of the one or more antennas 1810).

In some embodiments, the PMC 1812 may manage power provided to the baseband circuitry 1804. In particular, the PMC 1812 may control power-source selection, voltage scaling, battery charging, or DC-to-DC conversion. The PMC 1812 may often be included when the device 1800 is capable of being powered by a battery, for example, when the device is included in a UE. The PMC 1812 may increase the power conversion efficiency while providing desirable implementation size and heat dissipation characteristics.

While FIG. 18 shows the PMC 1812 coupled only with the baseband circuitry 1804. However, in other embodiments, the PMC 18 12 may be additionally or alternatively coupled with, and perform similar power management operations for, other components such as, but not limited to, application circuitry 1802, RF circuitry 1806, or FEM 1808.

In some embodiments, the PMC 1812 may control, or otherwise be part of, various power saving mechanisms of the device 1800. For example, if the device 1800 is in an RRC_Connected state, where it is still connected to the RAN node as it expects to receive traffic shortly, then it may enter a state known as Discontinuous Reception Mode (DRX) after a period of inactivity. During this state, the device 1800 may power down for brief intervals of time and thus save power.

If there is no data traffic activity for an extended period of time, then the device 1800 may transition off to an RRC_Idle state, where it disconnects from the network and does not perform operations such as channel quality feedback, handover, etc. The device 1800 goes into a very low power state and it performs paging where again it periodically wakes up to listen to the network and then powers down again. The device 1800 may not receive data in this state, in order to receive data, it can transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1802 and processors of the baseband circuitry 1804 may be used to execute elements of one or more instances of a protocol stack. For example, processors of the baseband circuitry 1804, alone or in combination, may be used execute Layer 3, Layer 2, or Layer 1 functionality, while processors of the application circuitry 1804 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

FIG. 1900 illustrates example interfaces of baseband circuitry in accordance with some embodiments. As discussed above, the baseband circuitry 1804 of FIG. 18 may comprise processors 1804a-1804e and a memory 1804g utilized by said processors. Each of the processors 1804a-1804e may include a memory interface, 1904a-1904e, respectively, to send/receive data to/from the memory 1804g.

The baseband circuitry 1804 may further include one or more interfaces to communicatively couple to other circuitries/devices, such as a memory interface 1912 (e.g., an interface to send/receive data to/from memory external to the baseband circuitry 1804), an application circuitry interface 1914 (e.g., an interface to send/receive data to/from the application circuitry 1802 of FIG. 18), an RF circuitry interface 1916 (e.g., an interface to send/receive data to/from RF circuitry 1806 of FIG. 18), a wireless hardware connectivity interface 1918 (e.g., an interface to send/receive data to/from Near Field Communication (NFC) components, Bluetooth® components (e.g., Bluetooth® Low Energy), Wi-Fi® components, and other communication components), and a power management interface 1920 (e.g., an interface to send/receive power or control signals to/from the PMC 1812.

Figure 19:
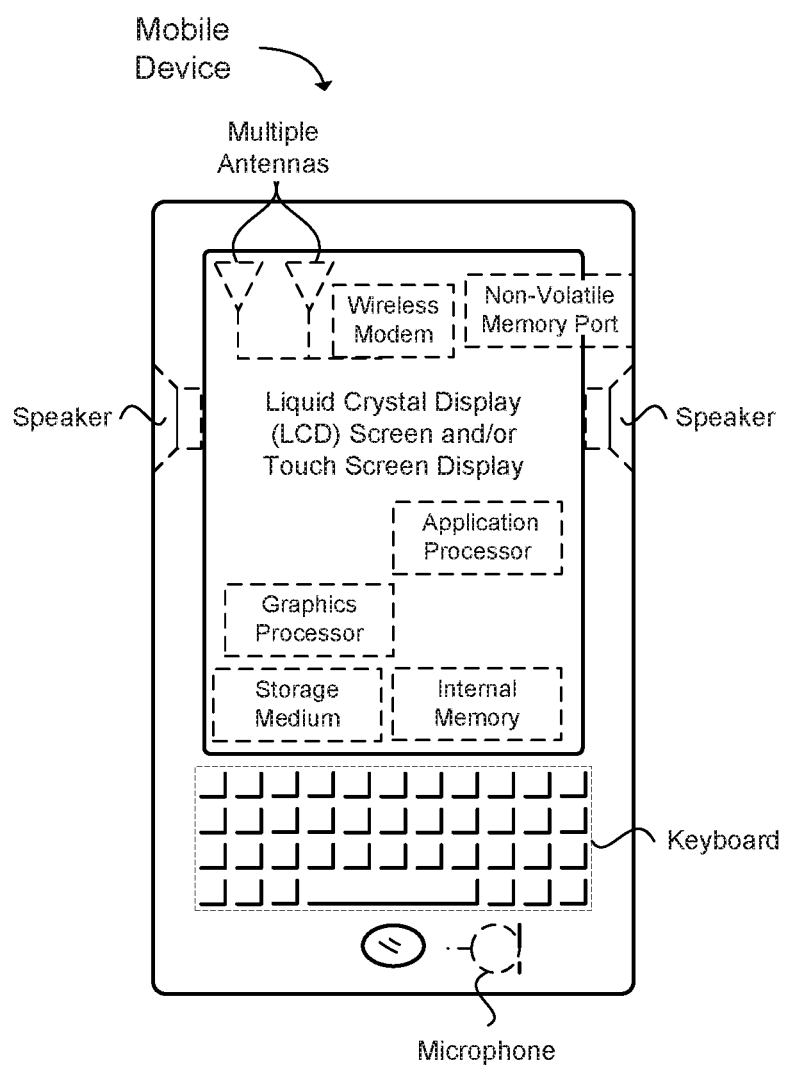
FIG. 19 illustrates a diagram of a wireless device (e.g., UE) in accordance with an example.

FIG. 19 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN) or, transmission station, such as a base station (BS), an evolved Node B (eNB), a baseband processing unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard such as, but not limited to, 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The wireless device can also comprise a wireless modem. The wireless modem can comprise, for example, a wireless radio transceiver and baseband circuitry (e.g., a baseband processor). The wireless modem can, in one example, modulate signals that the wireless device transmits via the one or more antennas and demodulate signals that the wireless device receives via the one or more antennas.

FIG. 19 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

EXAMPLES

The following examples pertain to specific technology embodiments and point out specific features, elements, or actions that can be used or otherwise combined in achieving such embodiments.

Example 1 includes an apparatus of a user equipment (UE) operable to encode a New Radio (NR) short duration physical uplink control channel (PUCCH) for transmission to a Next Generation NodeB (gNB), the apparatus comprising: one or more processors configured to: identify, at the UE, uplink control information (UCI) for the UE; multiplex, using frequency division multiplexing (FDM) at the UE, the UCI and a pseudo-random sequence associated with a demodulation reference signal (DMRS) onto a plurality of subcarriers in one or more physical resource blocks (PRBs) of one or more orthogonal frequency division multiplexing (OFDM) symbols; and encode, at the UE, the UCI and the pseudo-random sequence associated with the DMRS for transmission on the NR short duration PUCCH to the gNB; and a memory interface configured to retrieve from a memory the UCI.

Example 2 includes the apparatus of Example 1, further comprising a transceiver configured to transmit the UCI and the pseudo-random sequence associated with the DMRS to the gNB over the NR short duration PUCCH.

Example 3 includes the apparatus of any of Examples 1 to 2, wherein the one or more PRBs used to form the NR short duration PUCCH include: two or more contiguous PRBs; or two or more non-contiguous PRBs.

Example 4 includes the apparatus of any of Examples 1 to 3, wherein a given PRB used to form the NR short duration PUCCH includes 12 subcarriers, wherein 4 subcarriers of the 12 subcarriers correspond to the pseudo-random sequence associated with the DMRS carried in the NR short duration PUCCH, and 8 subcarriers of the 12 subcarriers correspond to the UCI carried in the NR short duration PUCCH.

Example 5 includes the apparatus of any of Examples 1 to 4, wherein the 4 subcarriers of the 12 subcarriers that correspond to the pseudo-random sequence associated with the DMRS carried in the NR short duration PUCCH include subcarriers 1, 4, 7 and 11 of the NR short duration PUCCH.

Example 6 includes the apparatus of any of Examples 1 to 5, wherein the NR short duration PUCCH that carries the UCI and the pseudo-random sequence associated with the DMRS comprises one or two OFDM symbols.

Example 7 includes the apparatus of any of Examples 1 to 6, wherein the UCI carried in the NR short duration PUCCH includes one or more of: channel state information (CSI), hybrid automatic repeat request acknowledgements (HARQ-ACKs), scheduling request (SR), or beam information.

Example 8 includes the apparatus of any of Examples 1 to 7, wherein the UCI and the pseudo-random sequence associated with the DMRS carried in the NR short duration PUCCH employ length-12 constant amplitude zero autocorrelation (CAZAC) sequences, respectively, when the UCI and the pseudo-random sequence associated with the DMRS are multiplexed using alternating subcarriers in two PRBs.

Example 9 includes the apparatus of any of Examples 1 to 8, wherein the pseudo-random sequence associated with the DMRS carried in the NR short duration PUCCH employs a length-4 discrete Fourier transform (DFT) sequence for each PRB.

Example 10 includes an apparatus of a user equipment (UE) operable to encode a New Radio (NR) long duration physical uplink control channel (PUCCH) for transmission to a Next Generation NodeB (gNB), the apparatus comprising: one or more processors configured to: identify, at the UE, uplink control information (UCI) for the UE; multiplex, using time division multiplexing (TDM) at the UE, UCI symbols associated with the UCI and pseudo-random sequence symbols associated with a demodulation reference signal (DMRS), wherein a number of pseudo-random sequence symbols that are multiplexed with the UCI symbols depends on a length of the NR long duration PUCCH; encode, at the UE, the UCI symbols and the pseudo-random sequence symbols associated with the DMRS for transmission to the gNB on the NR long duration PUCCH; and a memory interface configured to retrieve from a memory the UCI.

Example 11 includes the apparatus of Example 10, further comprising a transceiver configured to transmit the UCI symbols and the pseudo-random sequence symbols associated with the DMRS to the gNB over the NR long duration PUCCH.

Example 12 includes the apparatus of any of Examples 10 to 11, wherein: the NR long duration PUCCH carries 2 pseudo-random sequence symbols associated with the DMRS when the length of the NR long duration PUCCH is 4 Discrete Fourier Transform-spread-OFDM (DFT-s-OFDM) symbols; or the NR long duration PUCCH carries 3 pseudo-random sequence symbols associated with the DMRS when the length of the NR long duration PUCCH is 7 DFT-s-OFDM symbols.

Example 13 includes the apparatus of any of Examples 10 to 12, wherein the NR long duration PUCCH carrying the UCI symbols and the pseudo-random sequence symbols associated with the DMRS is multiplexed to a PUCCH carrying a scheduling request (SR) sequence of a same length within a same physical resource block (PRB) using different cyclic shifts of a same constant amplitude zero autocorrelation (CAZAC) sequence.

Example 14 includes the apparatus of any of Examples 10 to 13, wherein the NR long duration PUCCH applies a unique orthogonal cover code (OCC) and a unique cyclic shift to the UCI symbols and the pseudo-random sequence symbols associated with the DMRS, respectively, as compared to other UEs when UE multiplexing is employed to multiplex NR long duration PUCCH transmissions for multiple UEs.

Example 15 includes the apparatus of any of Examples 10 to 14, wherein the NR long duration PUCCH that carries the UCI symbols and the pseudo-random sequence symbols associated with the DMRS ranges from 4 Discrete Fourier Transform-spread-OFDM (DFT-s-OFDM) symbols in length to 14 DFT-s-OFDM symbols in length.

Example 16 includes the apparatus of any of Examples 10 to 15, wherein the UCI symbols carried in the NR long duration PUCCH includes one or more of: channel state information (CSI), hybrid automatic repeat request acknowledgements (HARQ-ACKs), scheduling request (SR), or beam information.

Example 17 includes at least one machine readable storage medium having instructions embodied thereon for encoding a New Radio (NR) physical uplink control channel (PUCCH) for transmission from a user equipment (UE) to a Next Generation NodeB (gNB), the instructions when executed by one or more processors at the UE perform the following: identifying, at the UE, uplink control information (UCI) for the UE; identifying, at the UE, a pseudo-random sequence associated with a demodulation reference signal (DMRS) for the UE; multiplexing, at the UE, the UCI and the pseudo-random sequence associated with the DMRS using frequency division multiplexing (FDM) when the NR PUCCH is a NR short duration PUCCH, wherein the UCI and the pseudo-random sequence associated with the DMRS are multiplexed using different subcarriers in one or more physical resource blocks (PRBs) when the NR PUCCH is a NR short duration PUCCH; multiplexing, at the UE, the UCI and the pseudo-random sequence associated with the DMRS using time division multiplexing (TDM) when the NR PUCCH is a NR long duration PUCCH, wherein a number of pseudo-random sequence symbols associated with the DMRS depends on a length of the NR long duration PUCCH; and encoding, at the UE, the UCI and the pseudo-random sequence associated with the DMRS for transmission to the gNB over the NR PUCCH.

Example 18 includes the at least one machine readable storage medium of Example 17, wherein the NR short duration PUCCH comprises one or two orthogonal frequency division multiplexing (OFDM) symbols.

Example 19 includes the at least one machine readable storage medium of any of Examples 17 to 18, wherein the NR long duration PUCCH ranges from 4 Discrete Fourier Transform-spread-OFDM (DFT-s-OFDM) symbols in length to 14 DFT-s-OFDM symbols in length.

Example 20 includes the at least one machine readable storage medium of any of Examples 17 to 19, wherein the UCI carried in the NR PUCCH includes one or more of: channel state information (CSI), hybrid automatic repeat request acknowledgements (HARQ-ACKs), scheduling request (SR), or beam information.

Example 21 includes a user equipment (UE) operable to encode a New Radio (NR) physical uplink control channel (PUCCH) for transmission from a user equipment (UE) to a Next Generation NodeB (gNB), the UE comprising: means for identifying, at the UE, uplink control information (UCI) for the UE; means for identifying, at the UE, a pseudo-random sequence associated with a demodulation reference signal (DMRS) for the UE; means for multiplexing, at the UE, the UCI and the pseudo-random sequence associated with the DMRS using frequency division multiplexing (FDM) when the NR PUCCH is a NR short duration PUCCH, wherein the UCI and the pseudo-random sequence associated with the DMRS are multiplexed using different subcarriers in one or more physical resource blocks (PRBs) when the NR PUCCH is a NR short duration PUCCH; means for multiplexing, at the UE, the UCI and the pseudo-random sequence associated with the DMRS using time division multiplexing (TDM) when the NR PUCCH is a NR long duration PUCCH, wherein a number of pseudo-random sequence symbols associated with the DMRS depends on a length of the NR long duration PUCCH; and means for encoding, at the UE, the UCI and the pseudo-random sequence associated with the DMRS for transmission to the gNB over the NR PUCCH.

Example 22 includes the UE of Example 21, wherein the NR short duration PUCCH comprises one or two orthogonal frequency division multiplexing (OFDM) symbols.

Example 23 includes the UE of any of Examples 21 to 22, wherein the NR long duration PUCCH ranges from 4 Discrete Fourier Transform-spread-OFDM (DFT-s-OFDM) symbols in length to 14 DFT-s-OFDM symbols in length.

Example 24 includes the UE of any of Examples 21 to 23, wherein the UCI carried in the NR PUCCH includes one or more of: channel state information (CSI), hybrid automatic repeat request acknowledgements (HARQ-ACKs), scheduling request (SR), or beam information.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). In one example, selected components of the transceiver module can be located in a cloud radio access network (C-RAN). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology.

What is claimed is:

1. An apparatus of a user equipment (UE) operable to encode a physical uplink control channel (PUCCH) for transmission to a New Radio (NR) base station, the apparatus comprising:
one or more processors configured to:
identify, at the UE, uplink control information;
identify, at the UE, a demodulation reference signal (DMRS);
multiplex, using frequency division multiplexing (FDM) at the UE, the uplink control information and the DMRS onto a plurality of subcarriers in one or more physical resource blocks (PRBs) of one or more orthogonal frequency division multiplexing (OFDM) symbols; and
encode, at the UE, the uplink control information that is multiplexed with the DMRS for transmission on the PUCCH to the NR base station, wherein the uplink control information transmitted over the PUCCH changes frequency during transmission, wherein one DMRS symbol is configured in one transmission of the PUCCH with five symbols, and two DMRS symbols are configured in another transmission of the PUCCH with seven symbols, when a PUCCH length is 12 OFDM symbols; and
a memory interface configured to retrieve from a memory the uplink control information and the DMRS.

2. The apparatus of claim 1, further comprising a transceiver configured to transmit the uplink control information that is multiplexed with the DMRS to the NR base station over the PUCCH.

3. The apparatus of claim 1, wherein the DMRS is transmitted on four subcarriers per PRB.

4. The apparatus of claim 1, wherein the uplink control information transmitted over the PUCCH applies an orthogonal cover code over PUCCH symbols and the subcarriers within each OFDM symbol carry different modulation symbols.

5. The apparatus of claim 4, wherein a length of the orthogonal cover code is based on a PUCCH length.

6. The apparatus of claim 1, wherein one DMRS symbol is configured at a middle when a PUCCH length is four symbols.

7. At least one machine readable non-transitory storage medium having instructions embodied thereon for encoding a New Radio (NR) short duration physical uplink control channel (PUCCH) for transmission from a user equipment (UE) to a base station, the instructions when executed by one or more processors at the UE perform the following:
identifying, at the UE, uplink control information (UCI) for the UE;
multiplexing, using frequency division multiplexing (FDM) at the UE, the UCI and a pseudo-random sequence associated with a demodulation reference signal (DMRS) onto a plurality of subcarriers in one or more physical resource blocks (PRBs) of one or more orthogonal frequency division multiplexing (OFDM) symbols; and
encoding, at the UE, the UCI and the pseudo-random sequence associated with the DMRS for transmission on the NR short duration PUCCH to the base station, wherein the UCI transmitted on the NR short duration PUCCH changes frequency during transmission, wherein the pseudo-random sequence associated with the DMRS carried in the NR short duration PUCCH employs a length-4 discrete Fourier transform (DFT) sequence for each PRB.

8. The at least one non-transitory machine readable storage medium of claim 7, wherein the one or more PRBs used to form the NR short duration PUCCH include:
two or more contiguous PRBs; or
two or more non-contiguous PRBs.

9. The at least one non-transitory machine readable storage medium of claim 7, wherein a given PRB used to form the NR short duration PUCCH includes 12 subcarriers, wherein 4 subcarriers of the 12 subcarriers correspond to the pseudo-random sequence associated with the DMRS carried in the NR short duration PUCCH, and 8 subcarriers of the 12 subcarriers correspond to the UCI carried in the NR short duration PUCCH.

10. The at least one non-transitory machine readable storage medium of claim 9, wherein the 4 subcarriers of the 12 subcarriers that correspond to the pseudo-random sequence associated with the DMRS carried in the NR short duration PUCCH include subcarriers 1, 4, 7 and 11 of the NR short duration PUCCH.

11. The at least one non-transitory machine readable storage medium of claim 7, wherein the NR short duration PUCCH that carries the UCI and the pseudo-random sequence associated with the DMRS comprises one or two OFDM symbols.

12. The at least one non-transitory machine readable storage medium of claim 7, wherein the UCI carried in the NR short duration PUCCH includes one or more of: channel state information (CSI), hybrid automatic repeat request acknowledgements (HARQ-ACKs), scheduling request (SR), or beam information.

13. The at least one non-transitory machine readable storage medium of claim 7, wherein the UCI and the pseudo-random sequence associated with the DMRS carried in the NR short duration PUCCH employ length-12 constant amplitude zero autocorrelation (CAZAC) sequences, respectively, when the UCI and the pseudo-random sequence associated with the DMRS are multiplexed using alternating subcarriers in two PRBs.

14. At least one non-transitory machine readable storage medium having instructions embodied thereon for encoding a New Radio (NR) long duration physical uplink control channel (PUCCH) for transmission from a user equipment (UE) to a base station, the instructions when executed by one or more processors at the UE perform the following:
identifying, at the UE, uplink control information (UCI) for the UE;
multiplexing, using time division multiplexing (TDM) at the UE, UCI symbols associated with the UCI and pseudo-random sequence symbols associated with a demodulation reference signal (DMRS), wherein a number of pseudo-random sequence symbols that are multiplexed with the UCI symbols depends on a length of the NR long duration PUCCH; and
encoding, at the UE, the UCI symbols and the pseudo-random sequence symbols associated with the DMRS for transmission to the base station on the NR long duration PUCCH, wherein the UCI transmitted on the NR long duration PUCCH changes frequency during transmission, wherein the NR long duration PUCCH carrying the UCI symbols and the pseudo-random sequence symbols associated with the DMRS is multiplexed to a PUCCH carrying a scheduling request (SR) sequence of a same length within a same physical resource block (PRB) using different cyclic shifts of a same constant amplitude zero autocorrelation (CA-ZAC) sequence.

15. The at least non-transitory one machine readable storage medium of claim 14, wherein:
the NR long duration PUCCH carries 2 pseudo-random sequence symbols associated with the DMRS when the length of the NR long duration PUCCH is 4 Discrete Fourier Transform-spread-OFDM (DFT-s-OFDM) symbols; or
the NR long duration PUCCH carries 3 pseudo-random sequence symbols associated with the DMRS when the length of the NR long duration PUCCH is 7 DFT-s-OFDM symbols.

16. The at least one non-transitory machine readable storage medium of claim 14, wherein the NR long duration PUCCH applies a unique orthogonal cover code (OCC) and a unique cyclic shift to the UCI symbols and the pseudo-random sequence symbols associated with the DMRS, respectively, as compared to other UEs when UE multiplexing is employed to multiplex NR long duration PUCCH transmissions for multiple UEs.

17. The at least one non-transitory machine readable storage medium of claim 14, wherein the NR long duration PUCCH that carries the UCI symbols and the pseudo-random sequence symbols associated with the DMRS ranges from 4 Discrete Fourier Transform-spread-OFDM (DFT-s-OFDM) symbols in length to 14 DFT-s-OFDM symbols in length.

18. The at least one non-transitory machine readable storage medium of claim 14, wherein the UCI symbols carried in the NR long duration PUCCH includes one or more of: channel state information (CSI), hybrid automatic repeat request acknowledgements (HARQ-ACKs), scheduling request (SR), or beam information.

* * * * *